US006049354A

United States Patent [19]

Sekine et al.

[11] Patent Number: 6,049,354

[45] Date of Patent: Apr. 11, 2000

[54] IMAGE SHAKE-CORRECTING SYSTEM WITH SELECTIVE IMAGE-SHAKE CORRECTION

[75] Inventors: Masayoshi Sekine, Tokyo; Toshiaki Kondo, Kanagawa-ken, both of Japan

[73] Assignee: Canon Kabushiki Kaisha, Japan

[21] Appl. No.: 08/796,681

[22] Filed: Feb. 6, 1997

Related U.S. Application Data

[62] Division of application No. 08/321,883, Oct. 14, 1994, Pat. No. 5,614,945.

[30] Foreign Application Priority Data

| | | | |
|---|---|---|---|
| Oct. 19, 1993 | [JP] | Japan | 5-284541 |
| Oct. 19, 1993 | [JP] | Japan | 5-284542 |
| Oct. 22, 1993 | [JP] | Japan | 5-287675 |

[51] Int. Cl.[7] .......... H04N 5/228

[52] U.S. Cl. .......... 348/208; 348/699

[58] Field of Search .......... 348/208, 700, 348/701, 699

[56] References Cited

U.S. PATENT DOCUMENTS

| | | | |
|---|---|---|---|
| 5,023,905 | 6/1991 | Koga | 358/105 |
| 5,296,925 | 3/1994 | Kondo et al. | 348/208 |
| 5,321,515 | 6/1994 | Kusaka et al. | 348/208 |
| 5,493,345 | 2/1996 | Ishikawa et al. | 348/700 |
| 5,497,191 | 3/1996 | Yoo et al. | 348/208 |
| 5,648,815 | 7/1997 | Toba | 348/208 |

FOREIGN PATENT DOCUMENTS

| | | | |
|---|---|---|---|
| 0389192 | 9/1990 | European Pat. Off. | H04N 5/225 |
| 0472806 | 3/1992 | European Pat. Off. | H04N 5/14 |
| 0555873 | 8/1993 | European Pat. Off. | G06F 15/70 |
| 0555874 | 8/1993 | European Pat. Off. | G06F 15/70 |
| 63-166370 | 7/1988 | Japan . | |
| 2165417 | 4/1986 | United Kingdom | H04N 5/253 |
| 2263602 | 7/1993 | United Kingdom | H04N 5/14 |

OTHER PUBLICATIONS

IBM Technical Disclosure Bulletin, vol. 34, No. 10A, Mar. 1992 Method Of Detecting Scene Changes In Moving Pictures.

IBM Technical Disclosure Bulletin, vol. 35, No. 1B, Jun. 1992 Method Of Dissolve Detection In Moving Picture.

Electronic Image Stabilization System For Video Cameras and VCRs, K. Uomori, A. Morimura, and H. Ishii; SMPTE Journal, Feb. 1992.

"Proposal for Interactive Video Editing System Utilizing Recognition Technique," Journal of the Institute of Electronics, Information and Communication Engineers, D–11 vol. J75–D–II No. 2, pp. 216–225, Feb. 1992.

*Primary Examiner*—Bryan Tung
*Attorney, Agent, or Firm*—Fitzpatrick, Cella, Harper & Scinto

[57] ABSTRACT

An image processing system comprises an image shifting circuit for shifting an image by processing an input video signal, a scene-change detecting circuit for detecting the presence or absence of a scene change in the input video signal, and a control circuit for controlling the amount in which the image is shifted by the image shifting circuit, according to the presence or absence of the scene change detected by the scene-change detecting circuit.

18 Claims, 16 Drawing Sheets

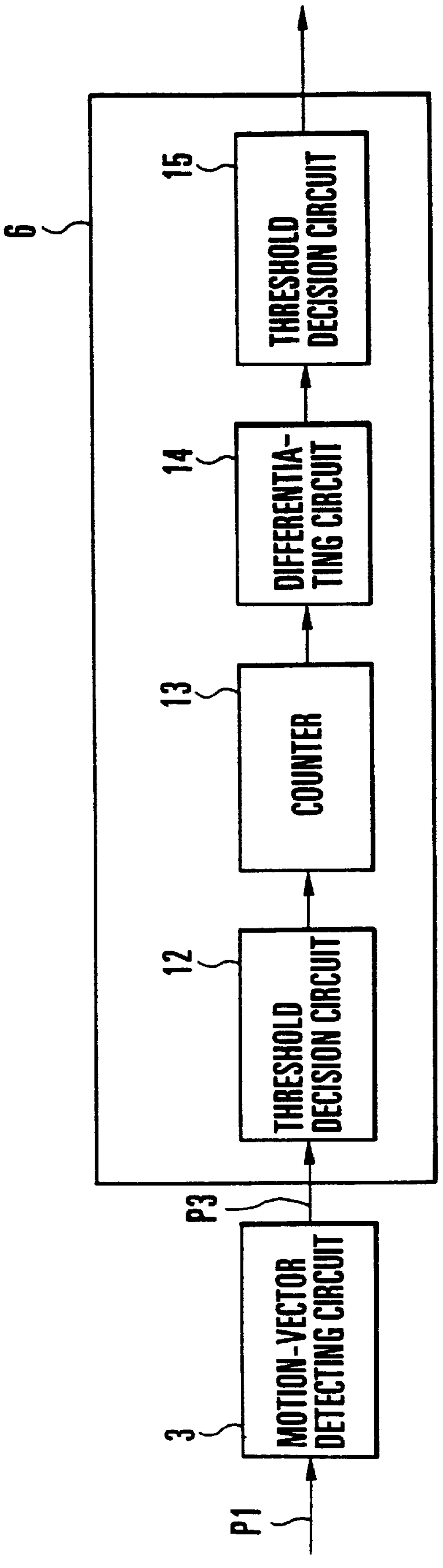
F I G. 4

FIG.8(a) Y SIGNAL

FIG.8(b) CHROMINANCE SIGNAL

FIG.8(c) HIGH-FREQUENCY COMPONENT OF Y SIGNAL

FIG.8(d) VALUE OF K

FIG.8(e) TIME t (SECONDS)

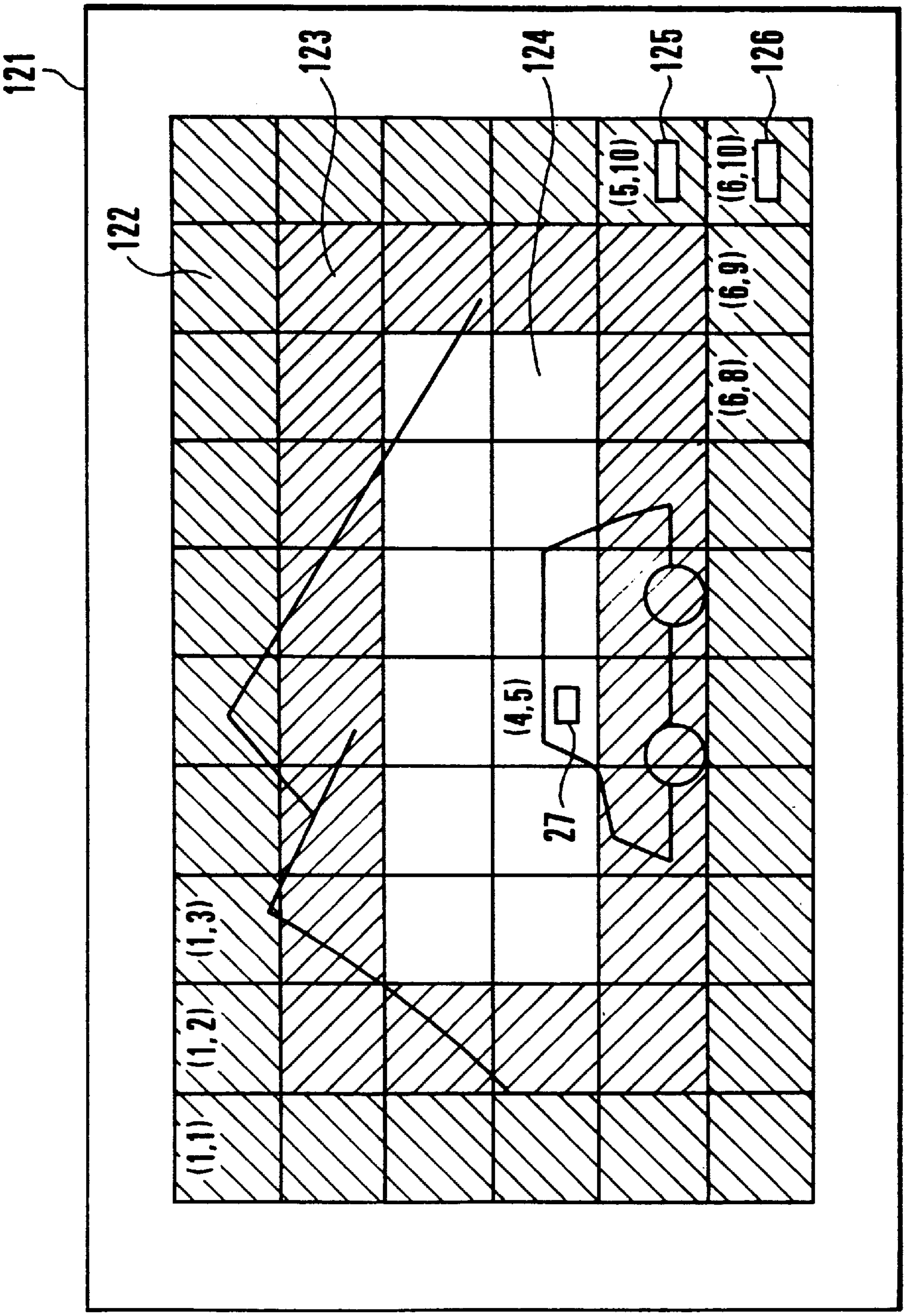
F I G.14

IMAGE SHAKE-CORRECTING SYSTEM WITH SELECTIVE IMAGE-SHAKE CORRECTION

This application is a division of application Ser. No. 08/321,883 filed Oct. 14, 1994 now U.S. Pat. No. 5,614,945.

BACKGROUND OF THE INVENTION

1. Field of the Invention

The present invention relates to an image-shake correcting system for correcting an image shake due to a vibration of a camera which occurred during photography, during a reproducing operation of a video reproducing apparatus, during a receiving, operation of a communication receiver, or the like.

2. Description of the Related Art

The image-shake correcting system shown in FIG. 1 is described in Japanese Laid-Open Patent Application No. Sho 63-166370 as one example of an image-shake correcting system suitable for use in a video reproducing apparatus having the function of correcting an image shake due to a vibration of a camera which occurred during photography.

Referring to FIG. 1, a video reproducing apparatus 1 is provided for reproducing a video signal and outputting a reproduced video signal P1. An image memory 2 is provided for temporarily storing the input video signal P1. A motion-vector detecting circuit 3 is provided for detecting a motion vector from the input video signal P1 and outputting a motion vector P2 and a maximum value P3 of a correlation coefficient of the previous image and the current image. A microcomputer 4 is provided for controlling the image memory 2 and an image enlarging circuit 5, and outputs a reading address P4 and digital data P5 indicative of an image enlargement ratio. The image enlarging circuit 5 is provided for enlarging an image read from the image memory 2 up to a normal image-plane size and providing an output video signal P6. Specifically, the motion of the image is detected from a displacement between a plurality of images stored in the image memory 2, and the area of the image memory 2 from which an image is to be read is shifted in a direction in which the motion can be cancelled. Accordingly, the size of the read image is smaller than the normal image-plane size, and the read image is enlarged up to the normal image-plane size.

In the image-shake correcting system arranged in the above-described manner, the video signal P1 reproduced by the video reproducing apparatus 1 is temporarily stored in the image memory 2 and is also supplied to the motion-vector detecting circuit 3. The motion-vector detecting circuit 3 detects the motion vector P2 indicative of the moving speed of the image from the input video signal P1 and supplies the motion vector P2 to the microcomputer 4. The microcomputer 4 determines the reading address P4 of the image memory 2 on the basis of the information indicated by the motion vector P2, and reads image information indicative of an image smaller than the original image from the image memory 2 while shifting this smaller image horizontally or vertically.

The image information read from the image memory 2 is supplied to the image enlarging circuit 5, and the read image is corrected in accordance with the digital data (image enlargement ratio) P5 supplied from the microcomputer 4, so that the read image is enlarged up to the normal image-plane size.

If an image shake exists in the reproduced video signal P1, it is corrected through the above-described series of operation, so that the video signal P6 indicative of a stable image free of the image shake is outputted.

A most general method for finding the motion vector P2 is a matching method. The matching method includes the steps of finding a correlation coefficient while displacing a recognition pattern of an immediately previous field and a recognition pattern of the current field with respect to each other, and determining as a motion vector the amount of displacement obtained when the correlation coefficient is a maximum. The motion-vector detecting circuit 3 is arranged to perform a calculation on the motion vector P2 in this manner, and outputs both the motion vector P2 and the maximum value P3 of the correlation coefficient to the microcomputer 4. The maximum value P3 of the correlation coefficient is used for evaluating the reliability of the motion vector P2.

There is another method of dividing an image plane into a plurality of area blocks and detecting a motion vector for each of the area blocks for the purpose of deforming a subject in the image plane, eliminating a subject which cannot be processed or automatically determining a subject the image of which is to be stabilized. In such a method, the microcomputer 4 combines the motion vectors obtained from the respective area blocks and calculates the amount of vibration of the entire image plane, by means of averaging or median processing. Since the thus-calculated value indicates a difference between frames or fields with reference to the position of an image, integration or filtering processing is performed to determine a final image correction vector, i.e., the reading address P4 of the image memory 2. Incidentally, the image enlargement ratio P5 is normally set to a constant value for each photographic state.

However, in the above-described conventional example, if image-shake correction is applied to an actually broadcast television image or an image recorded by a domestic-use video camera, the following problems take place. For example, in such a broadcast or recorded image, scene changes frequently occur (an image changes into an utterly different image). Particularly in the case of the image recorded by a domestic-use video camera, noise or synchronization deviation may occur each time a scene change appears. If the video signal P1 containing the noise or synchronization deviation is directly inputted to the motion-vector detecting circuit 3, no correlation between images is obtained and, each time a scene change appears, a motion-vector detection error occurs. If image-shake correction is simply applied to such a video signal P1, the image will instantaneously vibrate to a great extent and will be displayed as a disagreeable image.

Also, if an image is cut out from a peripheral portion of the original image when the reading address P4 is close to a limit of an address control range immediately before a scene change, the reading address P4 reaches its control limit value beyond which no image-shake correction can be performed, due to the motion-vector detection error during the scene change. In this case, the image-shake correction is impossible for a while after the scene change.

SUMMARY OF THE INVENTION

A first object of the present invention which has been made in light of the above-described problems is to optimize the operation of compensating for the motion of a reproduced image.

A second object of the present invention is to make it possible to correctly perform image-shake correction even when a scene change occurs.

To achieve the above objects, in accordance with one aspect of the present invention, there is provided an image-shake correcting system which comprises image shifting means for shifting an image by processing a video signal, scene-change detecting means for detecting the presence or absence of a scene change in an input image, and control means for controlling the amount in which the image is shifted by the image shifting means, according to the presence or absence of the scene change detected by the scene-change detecting means.

In accordance with another aspect of the present invention, there is provided an image-shake correcting system in which the control means is arranged to reset a cumulative value obtained by accumulating the amount of the past motion of the image, when the scene-change detecting means detects the scene change.

In accordance with another aspect of the present invention, there is provided an image-shake correcting system in which the control means is arranged to return an image cut-out position to the center of the image when the scene-change detecting means detects the scene change.

In accordance with another aspect of the present invention, there is provided an image-shake correcting system in which the scene-change detecting means is arranged to detect the presence or absence of the scene change on the basis of a comparison result obtained by comparing the magnitude of a maximum correlation value between the previous image and the current image with a threshold and a comparison result obtained by comparing the magnitude of a temporal variation of the maximum correlation value with a threshold.

Accordingly, the amount in which an image is shifted can be controlled according to the presence or absence of a scene change, so that even if a scene change occurs and a correlation between images disappears to cause a motion-vector detection error, it is possible to prevent an image from abruptly vibrating to a great extent.

A third object of the present invention is to vary an image-shake correction characteristic according to an operating mode to optimize motion correction.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 4 is a block diagram schematically showing the arrangement of a scene-change detecting circuit shown in FIG. 2;

FIG. 14 shows an example of a television image plane which is used to explain the principle of an image-shake correcting system according to a seventh embodiment of the present invention;

DETAILED DESCRIPTION OF THE PREFERRED EMBODIMENTS

Image-shake correcting systems according to preferred embodiments of the present invention will be described below with reference to the accompanying drawings.

Figure 1:
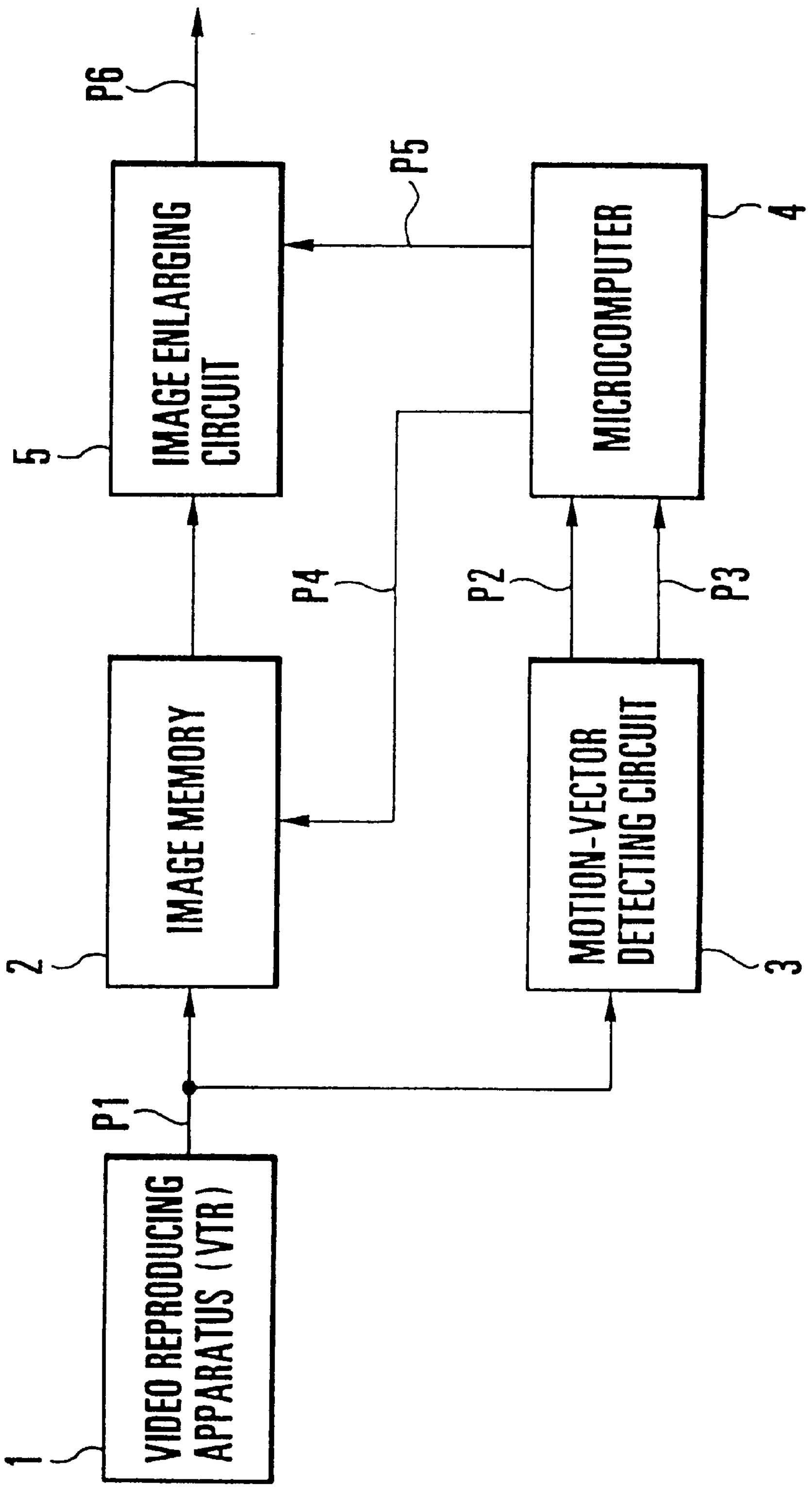
FIG. 1 is a block diagram schematically showing the arrangement of a general image-shake correcting system.
Figure 2:
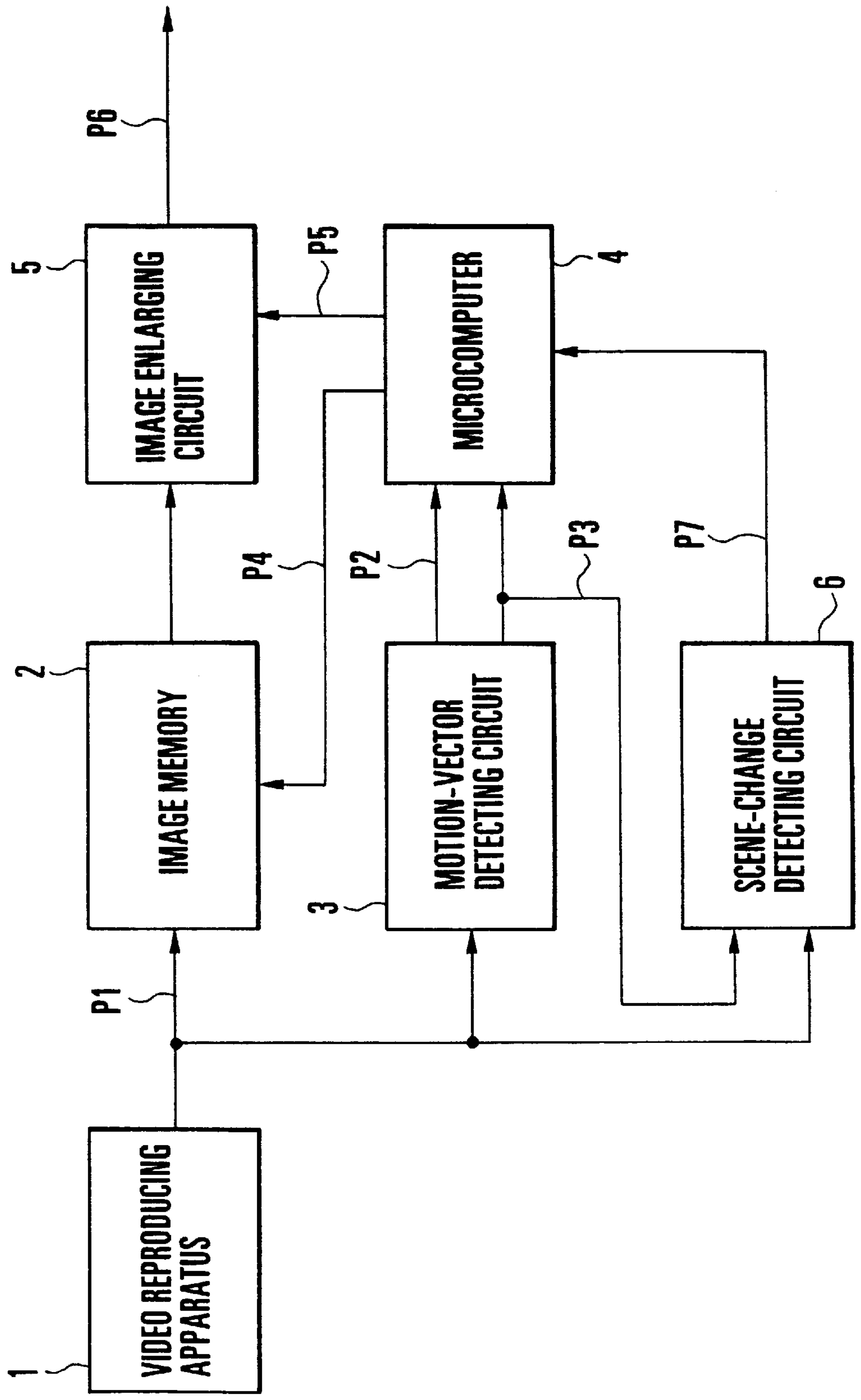
FIG. 2 is a block diagram schematically showing the arrangement of an image-shake correcting system according to a first embodiment of the present invention.

FIG. 2 is a block diagram schematically showing the arrangement of an image-shake correcting system according to a first embodiment of the present invention. The image-shake correcting system shown in FIG. 2 includes a video reproducing apparatus 1, an image memory 2, a motion-vector detecting circuit 3, a microcomputer 4 and an image enlarging circuit 5, and these blocks are identical to the corresponding blocks used in the image-shake correcting system shown in FIG. 1.

In the first embodiment, a scene-change detecting circuit 6 is newly added to the image-shake correcting system shown in FIG. 1. A video signal P1 reproduced by the video reproducing apparatus 1 and a maximum value P3 of a correction coefficient outputted from the motion-vector detecting circuit 3 are inputted to the scene-change detecting circuit 6, and an output signal P7 from the scene-change detecting circuit 6 is outputted to the microcomputer 4.

The image-shake correcting system is arranged to detect, at intervals of one field period, motion vectors of all detection blocks which are arranged in the form of an m×n matrix formed by dividing an image plane into m horizontal blocks and n vertical blocks.

The operation of the image-shake correcting system according to the first embodiment will be described below with reference to FIG. 3.

Figure 3:
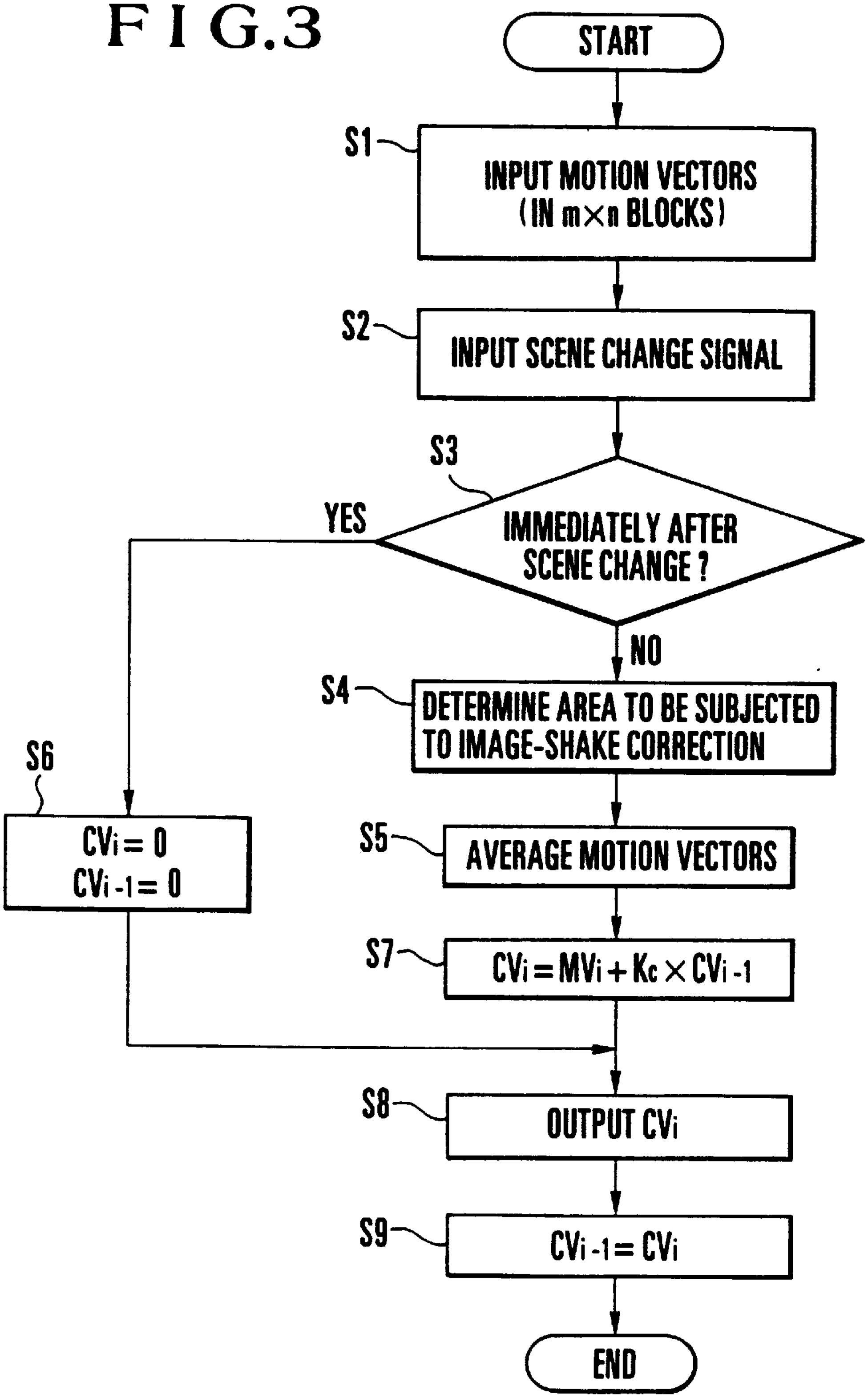
FIG. 3 is a flowchart showing the operation of the image-shake correcting system according to the first embodiment of the present invention.

FIG. 3 is a flowchart showing the operation of the image-shake correcting system according to the first embodiment. FIG. 3 shows the processing performed by the microcomputer 4 during each field period of a television signal, more particularly, the processing performed by the microcomputer 4 during the i-th field (i represents the count number of the current field).

In Step S1, the motion vectors P2 of all the m×n blocks obtained in the current field are inputted from the motion-vector detecting circuit 3 to the microcomputer 4.

In Step S2, a signal P7 which indicates whether the current field immediately follows a scene change is inputted from the scene-change detecting circuit 6 to the microcomputer 4.

In Step S3, it is determined whether the current field immediately follows a scene change, and if the answer is "No", the process proceeds to Step S4. If the answer is "Yes", the process proceeds to Step S6.

If it is determined that the current field does not immediately follow the scene change, the process proceeds to Step S4, in which it is determined which area is to be subjected to image-shake correction, on the basis of the state of orientation and the temporal variation of the motion vectors P2 in the image plane. Weight coefficients having larger values are generated for detection blocks to be subjected to image-shake correction, while weight coefficients having smaller values are generated for the other detection blocks.

In Step S5, the processing of averaging the motion vectors P2 according to the weight coefficients generated in Step S4 is performed to convert the motion vectors P2 into a motion vector of a subject area to be subjected to image-shake correction. The output value obtained in Step S5 is hereinafter represented by $MV_i$.

Then, in Step S7, the following expression is computed:

$$CV_i = MV_i + Kc \times CV_{i-1} \quad 0 < KC \leqq 1$$

where $CV_i$ represents an image correction vector which is obtained by multiplying the image correction vector $CV_{i-1}$ of the previous field by the control coefficient Kc and adding the resultant product to the currently obtained motion vector $MV_i$.

If KC<1, this computation provides a linear low-pass filter characteristic in which motion vector information about the past fields gradually disappears. If Kc=1, the computation provides a complete-integration characteristic in which the value of the currently obtained motion vector $MV_i$ is integrated.

Then, in Step S8, the image correction vector $CV_i$ is converted into a reading address P4 of the image memory 2 and the reading address P4 is outputted. In the first embodiment, it is assumed that if $CV_i=0$, an image is read from the central portion of the image plane.

Then, in Step S9, the image correction vector $CV_i$ of the current field is copied to the image correction vector $CV_{i-1}$ of the immediately previous field.

On the other hand, if the decision made in Step S3 indicates that the current field immediately follows a scene change, the process proceeds to Step S6, in which "0" is substituted for each of the image correction vector $CV_i$ of the current field and the image correction vector $CV_{i-1}$ of the immediately previous field. Then, the process skips Steps S4, S5 and S7 and executes Steps S8 and S9.

Specifically, in the case of a field which immediately follows the scene change, the image correction vector $CV_i$ is reset to zero so that the currently accumulated value is reset.

This resetting indicates that an image cut-out position is reset so that an image can be cut out from the central portion of the original image even if the immediately previous cut-out image is an image which has been cut out from a peripheral portion of the original image.

The scene-change detecting circuit 6 will be described below with reference to FIG. 4.

FIG. 4 is a block diagram schematically showing the arrangement of the scene-change detecting circuit 6 used in the first embodiment of the present invention.

Referring to FIG. 4, the motion-vector detecting circuit 3 detects a motion vector from the input video signal P1 and outputs the maximum value P3 of a correlation coefficient.

A threshold decision circuit 12 is provided for determining whether the maximum value P3 of the correlation coefficient outputted from the motion-vector detecting circuit 3 is greater than a preset threshold. The threshold decision circuit 12 outputs a pulse if the maximum value P3 of the correlation coefficient is greater than the preset threshold.

A counter 13 is provided for counting the number of pulses outputted from the threshold decision circuit 12.

A differentiating circuit 14 is provided for performing time differentiation on the number of counts.

A threshold decision circuit 15 is provided for determining whether the time differential of the number of counts which has been outputted from the differentiating circuit 14 is greater than a threshold.

In the above-described arrangement, in general and in the case or a normal moving image, since the threshold decision circuit 12 generates pulses with respect to almost all blocks contained in the image plane, the number of pulses counted by the counter 13 becomes large. In this case, if a scene change occurs, the correlation between the immediately previous image and the current image disappears and the maximum value P3 of the correlation coefficient outputted from the motion-vector detecting circuit 3 becomes small. As a result, the number of pulses generated by the threshold decision circuit 12 decreases and the number of pulses counted by the counter 13 also decreases.

Although it is possible to detect the scene change by using only the number of pulses counted by the counter 13, the image-shake correcting system may malfunction during panning of a camera or photography of a fast moving subject. To prevent such malfunction, in the first embodiment, the differentiating circuit 14 and the threshold decision circuit 15 are provided so that a scene change can be detected by making a decision as to the amount of temporal variation of the number of pulses counted by the counter 13.

Another scene-change detecting device is described in, for example, "Proposal for Interactive Video Editing System Utilizing Recognition Technique", a journal published by the Instituted of Electronics, Information and Communication Engineers, D-11 Vol. J75-D-II No. 2, pp. 216–225, February 1992. This paper states that the degree of similarity of a color histogram is found on a block-by-block basis and the number of blocks each of which exhibits a degree of similarity greater than a particular threshold is used as an interframe correlation value.

The description of the first embodiment has referred to the case in which a scene change in a video signal can be detected only from an image. However, in the case of a recording method of multiplexing a frame count number counted from the state of a recording with a video signal and recording the multiplexed signal, during reproduction, the frame count number is extracted and the time instant when the frame count number returns to zero is regarded as the time of occurrence of a scene change. Then, image-shake correction control characteristics may be varied by a method similar to the previously-described one.

The operation of the image-shake correcting system according to a second embodiment of the present invention will be described below with reference to FIG. 5.

Figure 5:
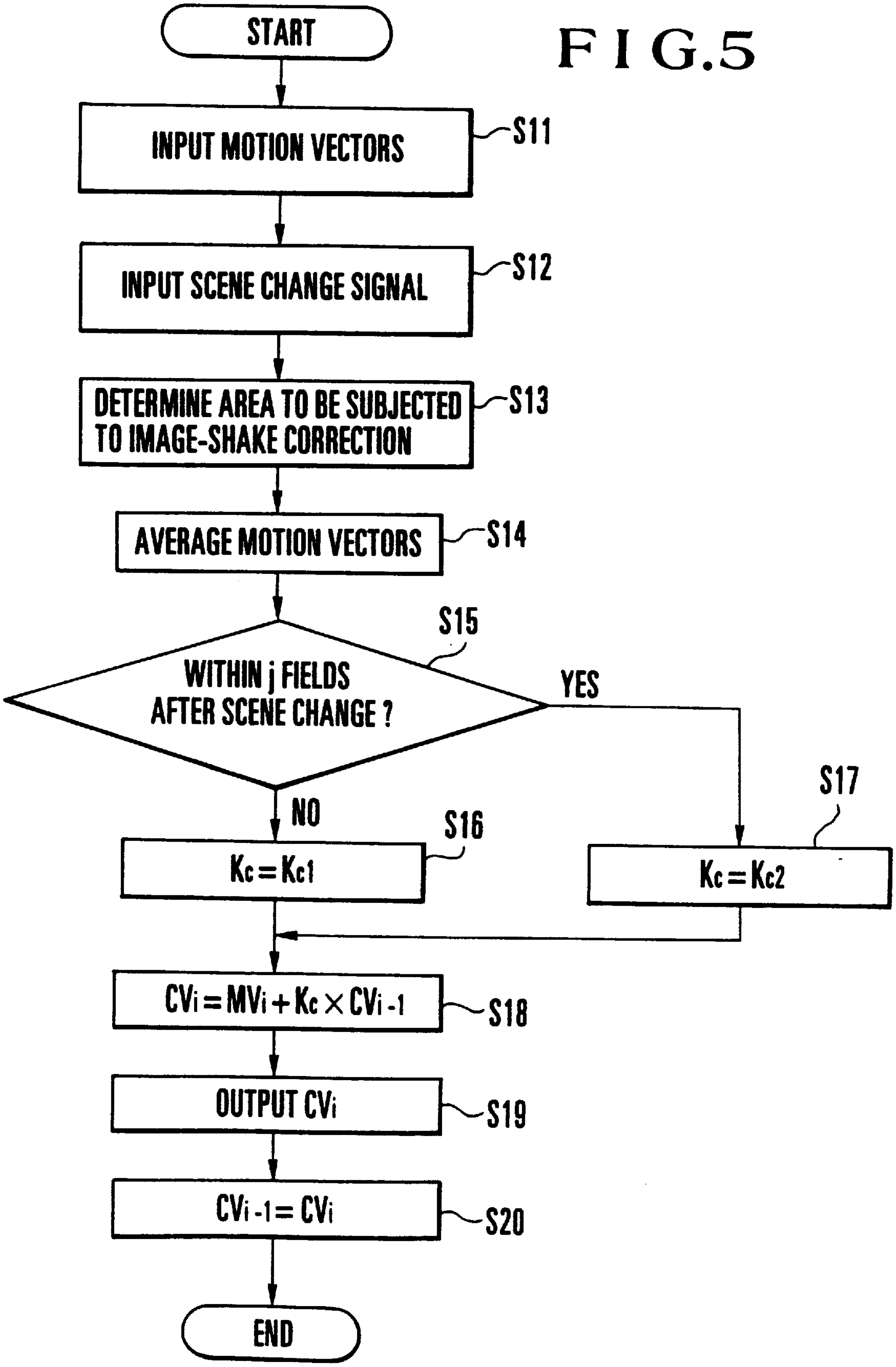
FIG. 5 is a flowchart schematically showing the operation of an image-shake correcting system according to a second embodiment of the present invention.

FIG. 5 is a flowchart showing the operation of the second embodiment. Similarly to FIG. 3, FIG. 5 shows the processing performed by the microcomputer 4 during each field period of a television signal, more particularly, the processing performed by the microcomputer 4 during the i-th field (i represents the count number of the current field).

In the first embodiment, as a method of varying the image-shake correction control characteristics, the image correction vector $CV_i$ of the current field and the image correction vector $CV_{i-1}$ of the previous field are reset to zero to instantaneously execute centering of the image plane.

However, the scene-change detecting circuit 6 shown in FIG. 4 may malfunction owing to an abrupt variation in an illumination intensity due to an emission from a flash unit, the light of a fluorescent lamp which may be recorded during photography or the activation of an autofocus operation or an auto-iris operation, so that an erroneous detection of a scene change may occur. If the scene-change detecting circuit 6 malfunctions in such a manner, an image will abruptly vibrate and be displayed as a disagreeable image. In the case of the method of detecting a scene change by using a frame count number, if remarkably similar scenes continue immediately before and after the scene change, the image will instantaneously vibrate to a great extent.

To eliminate the above-described disadvantage, the second embodiment is arranged to slowly center the image plane.

Specifically, in Step S11, the motion vectors P2 of all the m×n blocks obtained in the current field are inputted from the motion-vector detecting circuit 3 to the microcomputer 4.

In Step S12, a signal P7 which indicates whether the current field immediately follows a scene change is inputted from the scene-change detecting circuit 6 to the microcomputer 4.

In Step S13, it is determined which area is to be subjected to image-shake correction, on the basis of the state of orientation and the temporal variation of the motion vectors P2 in the image plane. Weight coefficients having larger values are generated for detection blocks to be subjected to image-shake correction, while weight coefficients having smaller values are generated for the other detection blocks.

In Step S14, the processing of averaging the motion vectors P2 according to the weight coefficients generated in Step S13 is performed to convert the motion vectors P2 into a motion vector of a subject area to be subjected to image-shake correction. The output value obtained in Step S14 is hereinafter represented by $MV_i$.

In Step S15, it is determined whether an elapsed time after the scene change is equal to or less than a time period of j fields. If the answer is "No", the process proceeds to Step S16, whereas if the answer is "Yes", the process proceeds to Step S17. The value of j is selected to be between approximately 30 and approximately 90, and represents the number of fields contained within a time of approximately one second.

In Step S16, an input value Kc1 is substituted for the control coefficient Kc. The input value Kc1 is selected to be approximately 0.99.

If the answer in Step S15 is "Yes", the process proceeds to Step S17, in which an input value Kc2 is substituted for the control variable Kc. The input value Kc2 is selected to be approximately 0.5–0.7, and is a relatively small value compared to the input value Kc1.

The fact that the input value Kc2 is made small indicates that the influence of an image correction vector applied to the previous field disappears quickly, i.e., centering of the image plane is gradually executed. When a sufficient time passes after the scene change, the input value Kc1 is written to the control variable Kc, and a normal image-shake correcting operation is continued.

Then, in Step S18, the following expression is computed:

$$CV_i = MV_i + Kc \times CV_{i-1} \quad 0 < KC \leqq 1$$

where $CV_i$ represents an image correction vector which is obtained by multiplying the image correction vector $CV_{i-1}$ of the previous field by the control coefficient Kc and adding the resultant product to the currently obtained motion vector $MV_i$.

Then, in Step S19, the image correction vector $CV_i$ is converted into the reading address P4 of the image memory 2 and the reading address P4 is outputted. In the second embodiment, it is assumed that if $CV_i=0$, an image is read from the central portion of the image plane.

Then, in Step S20, the image correction vector $CV_i$ of the current field is copied to the image correction vector $CV_{i-1}$ of the immediately previous field.

As described above, according to the second embodiment, the image plane is slowly centered for a time of approximately one second after a scene change. Accordingly, even if a malfunction occurs in the scene-change detecting circuit or another camera function, an image is prevented from vibrating abruptly to a great extent, whereby occurrence of a disagreeable image is prevented.

In addition, as described above, since the amount of shifting of an image is controlled according to the presence or absence of a scene change, even if a scene change occurs and the correlation between images disappears, it is possible to prevent an image from vibrating abruptly to a great extent. Accordingly, even immediately after the occurrence of a scene change, it is possible to correctly execute image-shake correction of an image, whereby it is possible to prevent occurrence of a disagreeable phenomenon, such as an unnecessary vibration of the image immediately after a scene change or a temporary stop of the image-shake correction.

A third embodiment of the present invention will be described below. The third embodiment is intended to provide image-vibration correction which is adapted to a function, such as a fade, mode settings or the like.

An image-shake correcting system for performing motion correction or image-shake correction on an image signal reproduced by a video reproducing apparatus is generally arranged as described previously with reference to FIG. 1.

In the above-described example, if image-shake correction is applied to an actually broadcast television image and an image recorded by a domestic-use video camera, the following problems occur. As is known, general television-image editing apparatus or cameras have the function of fading an image. This function serves to intentionally weaken a television video signal obtained during photography or reproduction and process the television video signal to produce an image having a particular color as a whole. Such a function has the effect of representing a scene change explicitly and visually naturally, and has conventionally frequently been used as a moving-image editing technique. In many cases, an achromatic color, such as white, black or gray, is used as the particular color.

In the case of an image-shake correcting system which is arranged to detect an image shake from a television image, since the contrast of an input image becomes low or the image becomes plain when a fade occurs in the image, the precision with which the image shake is detected becomes low or the detection of the image shake abruptly becomes impossible during the fade.

As a result, even if an image-shake correcting operation effectively works before the end of a scene, the image-shake correcting operation may become unstable or come to a stop at the end of the scene. This phenomenon leads to the problem that the image-shake correcting operation itself creates a visually unnatural image.

The third embodiment has been made in light of the above-described problem, and its object is to make it possible to output a visually natural, stable video image during the image-shake correcting operation even when image-fading processing is performed.

An image-shake correcting system according to the third embodiment comprises motion-vector detecting means for detecting a motion vector from an input video signal, image-shake correcting means for correcting a shake of an image on the basis of the motion vector detected by the motion-vector detecting means, fade detecting means for detecting a fading operation from the input video signal, and control means for controlling an image-shake correction characteristic of the image-shake correcting means according to the fading operation detected by the fade detecting means.

One feature of the image-shake correcting system according to the third embodiment resides in that the control means is arranged to gradually make an image-shake correcting operation for correcting the shake of the image less effective if the input video signal is being weakened by the fading operation, or gradually make the image-shake correcting operation for correcting the shake of the image more effective if the input video signal is being made stronger by the fading operation.

Another feature of the image-shake correcting system according to the third embodiment resides in that the control means is arranged to find a value of a variation of an information signal indicative of a state of a fade and control a rate at which the image-shake correction characteristic is made to vary, according to the value of the variation.

Another feature of the image-shake correcting system according to the third embodiment resides in that the fade detecting means is arranged to detect from the input video signal an average brightness, a brightest point, a darkest point, a spectrum component and an amplitude of a modulated chrominance signal of each image and make a decision as to a fade on the basis of correlations between variation rates of the average brightness, the brightest point, the darkest point, the spectrum component and the amplitude of the modulated chrominance signal.

In the image-shake correcting system according to the third embodiment, since it is possible to control the image-shake correction characteristic according to the fading operation, it is possible to prevent occurrence of the phenomenon in which, during a fading operation, the precision of detection of a motion vector is degraded to make the image-shake correcting operation unstable or the detection of the motion vector becomes impossible to stop the image-shake correcting operation. Accordingly, even if fade processing is performed, it is possible to output a visually natural, stable video image.

The image-shake correcting system according to the third embodiment will be described below with reference to FIG. 6, 7 and 8(*a*) to 8(*e*).

Figure 6:
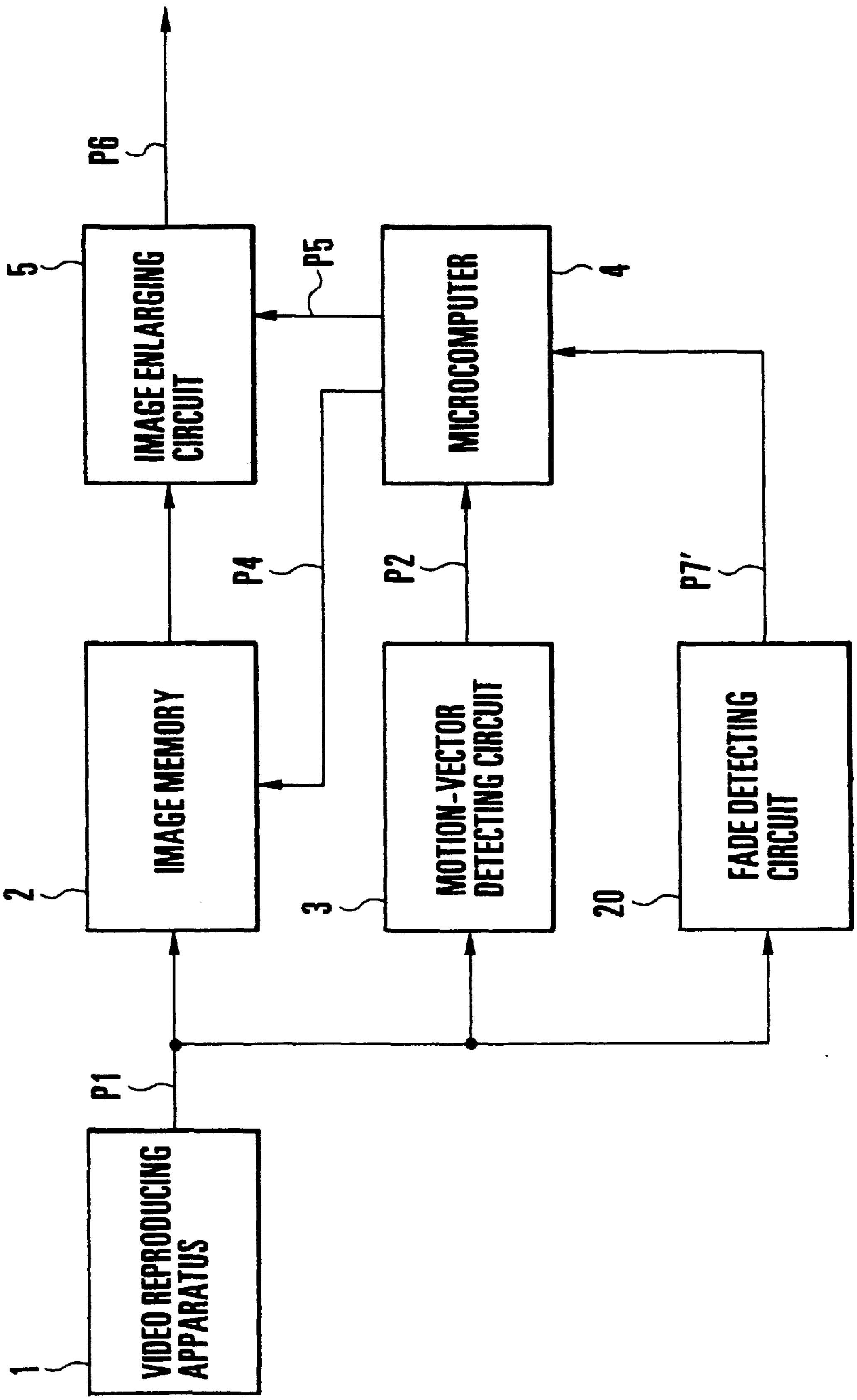
FIG. 6 is a block diagram schematically showing a third embodiment of the present invention.

FIG. 6 is a block diagram schematically showing the arrangement of the image-shake correction system according to the third embodiment. In FIG. 6, the video reproducing apparatus 1, the image memory 2, the motion-vector detecting circuit 3, the microcomputer 4 and the image enlarging circuit 5 are substantially identical to the corresponding elements used in the image-shake correcting system shown in FIG. 1. However, the processing operation of the microcomputer 4 differs from that of the microcomputer 4 shown in FIG. 1, and constitutes part of the feature of the third embodiment.

In the third embodiment, a fade detecting circuit 20 is newly added to the image-shake correcting system shown in FIG. 1, and the video signal P1 reproducing by the video reproducing apparatus 1 is inputted to the fade detecting circuit 20 and the output signal P7' of the fade detecting circuit 20 is outputted to the microcomputer 4. The video signal P1 is made up of a luminance signal Y, a gate signal Gate, a vertical synchronizing signal VD and a chrominance signal C, as shown in FIG. 7.

The fade detecting circuit 20 will be described below with reference to FIG. 7.

Figure 7:
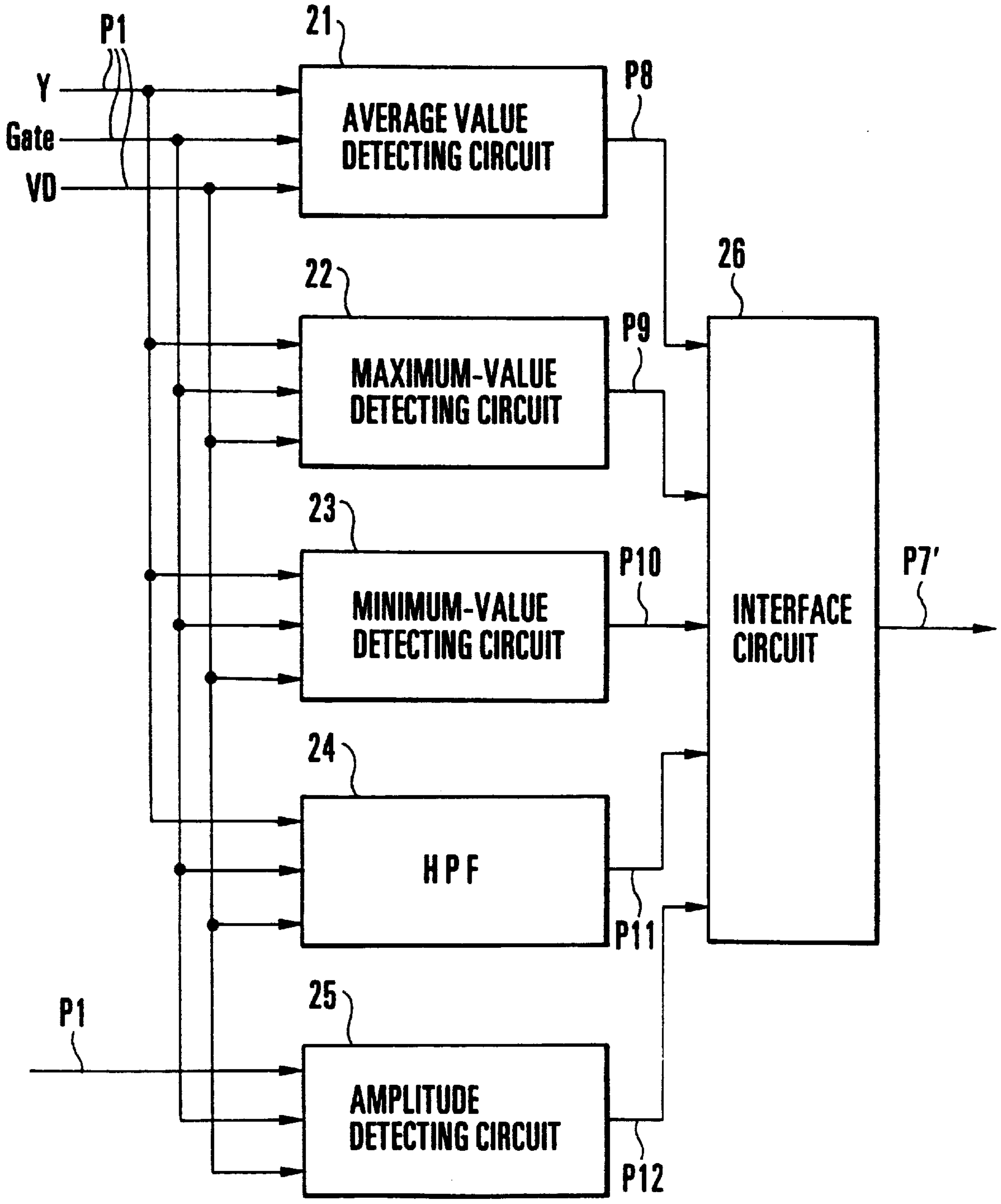
FIG. 7 is a block diagram schematically showing the arrangement of a fade detecting circuit according to the third embodiment of the present invention.

FIG. 7 is a block diagram schematically showing the arrangement of the fade detecting circuit 20 according to the third embodiment.

Referring to FIG. 7, an average value detecting circuit 21 serves to detect the average brightness of an image. The luminance signal Y, the gate signal Gate and the vertical synchronizing signal VD are inputted to the average value detecting circuit 21, and the average value detecting circuit 21 outputs an average value P8 of the luminance signal Y to an interface circuit 26. The average value P8 of the luminance signal Y is calculated as to only the effective pixels of each field on the basis of the vertical synchronizing signal VD and the gate signal Gate which indicates that a scanned pixel is an effective pixel. This calculation is completed by the start of the next field. The result of the calculation is reset at intervals of one field period.

A maximum-value detecting circuit 22 serves to detect the luminance of the image at the brightest point thereof. The luminance signal Y, the gate signal Gate and the vertical synchronizing signal VD are inputted to the maximum-value detecting circuit 22, and the maximum-value detecting circuit 22 outputs a maximum value P9 of the luminance signal Y to the interface circuit 26. Similarly to the calculation of the average value P8 of the luminance signal Y, the maximum value P9 of the luminance signal Y is calculated as to only the effective pixels of each field on the basis of the vertical synchronizing signal VD and the gate signal Gate which indicates that a scanned pixel is an effective pixel. This calculation is completed by the start of the next field. The result of the calculation is rest at intervals of one field period.

A minimum-value detecting circuit 23 serves to detect the luminance of the image at the darkest point thereof. The luminance signal Y, the gate signal Gate and the vertical synchronizing signal VD are inputted to the minimum-value detecting circuit 23, and the minimum-value detecting circuit 23 outputs a minimum value P10 of the luminance signal Y to the interface circuit 26. The minimum value P10 of the luminance signal Y is calculated as to only the effective pixels of each field on the basis of the vertical synchronizing signal VD and the gate signal Gate which indicates that a scanned pixel is an effective pixel. This calculation is completed by the start of the next field. The result of the calculation is reset at intervals of one field period.

A high-pass filter 24 serves to extract the edge component of the luminance signal Y which contains a large amount of noise. The luminance signal Y, the gate signal Gate and the vertical synchronizing signal VD are inputted to the high-pass filter 24, and the high-pass filter 24 outputs a high-frequency component P11 of the luminance signal Y to the interface circuit 26. The high-frequency component P11 of the luminance signal Y is calculated as to only the effective pixels of each field on the basis of the vertical synchronizing signal VD and the gate signal Gate which indicates that a scanned pixel is an effective pixel. This calculation is completed by the start of the next field. The result of the calculation is reset at intervals of one field period.

An amplitude detecting circuit 25 serves to detect the average amplitude of the chrominance signal C. The chrominance signal C, the gate signal Gate and the vertical synchronizing signal VD are inputted to the amplitude detecting circuit 25, and the amplitude detecting circuit 25 outputs an amplitude value P12 of the chrominance signal C to the interface circuit 26. The amplitude value P12 of the chrominance signal C is calculated as to only the effective pixels of each field on the basis of the vertical synchronizing signal VD and the gate signal Gate which indicates that a scanned pixel is an effective pixel. This calculation is completed by the start of the next field. The result of the calculation is reset at intervals of one field period.

The interface circuit 26 supplies to the microcomputer 4, as a fade information signal P7', each of the average value P8 of the luminance signal Y outputted from the average value detecting circuit 21, the maximum value P9 of the luminance signal Y outputted from the maximum-value detecting circuit 22, the minimum value P10 of the luminance signal Y outputted from the minimum-value detecting circuit 23, the high-frequency component P11 of the luminance signal Y outputted from the high-pass filter 24, and the amplitude Value P12 of the chrominance signal C outputted from the amplitude detecting circuit 25.

The processing of the microcomputer 4 will be described below.

The microcomputer 4 determines whether the current scene is fading into the next scene, by using the fade information signal P7' supplied from the fade detecting circuit 20.

The following description refers to now the luminance signal Y and the chrominance signal C vary when a fade occurs in an input image, as well as a method of determining how to detect the fade on the basis of the variation.

First, if the strength of each of the luminance signal Y and the chrominance signal C is represented by 0 to 1, a fade to a general simple color is expressed by the following expression:

$$Yo=K\cdot Yi+(1-K)Ya$$

$$Co=K\cdot Ci$$

where Yi represents an input signal of the luminance signal Y, Yo represents an output signal of the luminance signal Y, Ci represents an input signal of the chrominance signal C, Co represents an output signal of the chrominance signal C, K represents a fade coefficient and Ya represents the brightness of the image plane after the fade.

In the following description, reference is made to an example in which an ordinary image changes into a white image through a fade at the end of a scene.

In this case, as the fade coefficient K decreases from 1 toward 0 on a field-by-field basis, the contrast of the output signal gradually decreases and, finally, the luminance signal Y coincides with the brightness Ya of the image plane after the fade.

Figure 8:
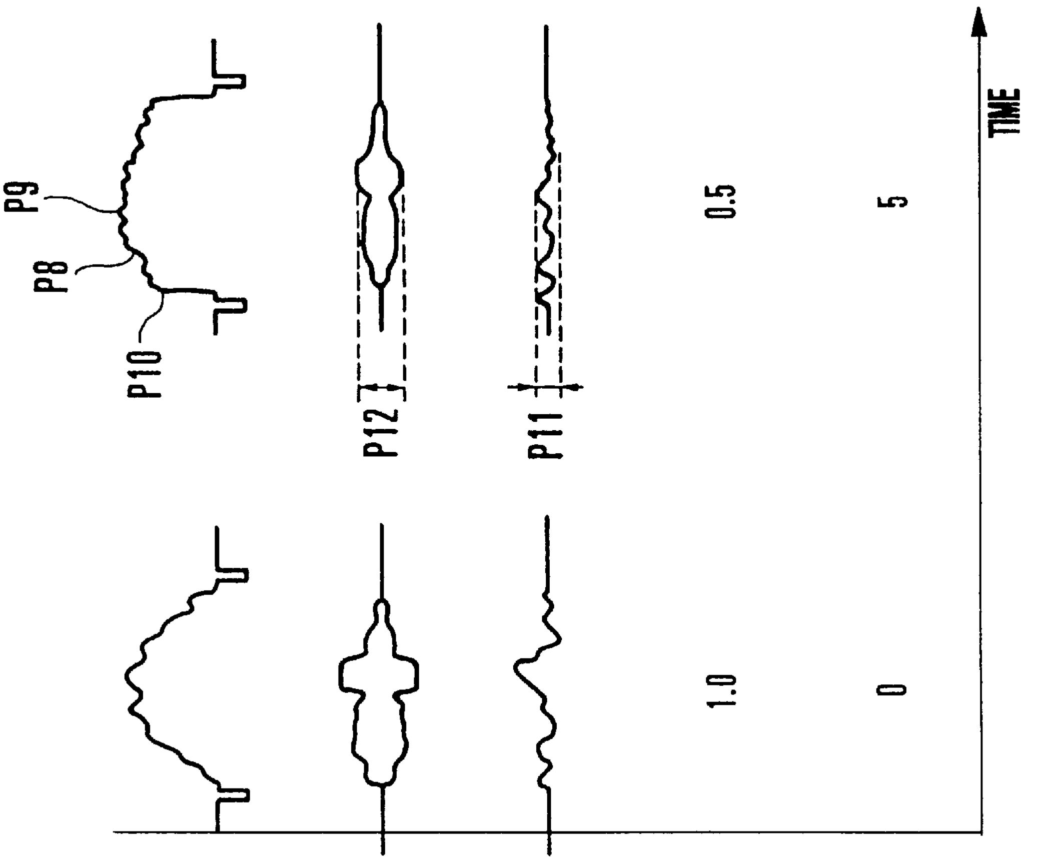
FIGS. 8(*a*) to 8(*e*) are waveform charts showing the states of variations of signal components of a video signal during a fade.

FIGS. 8(*a*) to 8(*e*) are waveform charts showing the states of variations of signal components of a video signal during a fade, and show the variation of the average value P8 of the luminance signal Y, the variation of the maximum value P9 of the luminance signal Y, the variation of the minimum value P10 of the luminance signal Y, the variation of the high-frequency component P11 of the luminance signal Y and the variation of the amplitude value P12 of the chrominance signal C.

FIGS. 8(*a*) to 8(*e*) show the state of an image signal contained in one line in the central portion of the image plane. FIG. 8(*a*) shows the luminance signal Y which contains horizontal synchronizing signals, FIG. 8(*b*) shows the modulated chrominance signal C, FIG. 8(*c*) shows the high-frequency component of the luminance signal Y, FIG. 8(*d*) shows the fade coefficient K, and FIG. 8(*e*) shows time t.

As shown, at the start of the fade, i.e., when the time t=0, the luminance signal Y, the chrominance signal C and the high-frequency component of the luminance signal Y have the signal values shown in FIGS. 8(*a*) to 8(*c*), respectively. When the fade starts and the fade coefficient K reaches 0.5, the difference between the maximum value P9 and the minimum value P10 of the luminance signal Y is reduced and approaches the average value P8. At the same time, the amplitude value P12 of the chrominance signal C and the high-frequency component P11 of the luminance signal Y are reduced.

However, the values of these signals may vary with a variation of a photographic status, so that it is often impossible to make a correct decision as to the occurrence of a fade on the basis of the state of each individual one of the aforesaid signals. For this reason, in the image-shake correcting system according to the third embodiment, the correlations between the respective signals are checked to correctly determine whether the current scene is fading.

For example, the phenomenon in which as the contrast of an input image becomes lower, the difference between the maximum value P9 and the minimum value P10 of the luminance signal Y becomes smaller and the amplitude of the high-frequency component P11 of the luminance signal Y which contains large amounts of noise components becomes smaller at a similar rate, rarely takes place during any normal photography other than fade photography, for example, even if a variation occurs in an illumination intensity, the state of an iris or the state of focus.

For this reason, the microcomputer 4 makes a decision as to the occurrence of a fade by estimating the rates of variations of the respective values P8, P9, P10, P11 and P12. Specifically, the microcomputer 4 computes:

(i) the value of a variation of (the maximum value P9 of the luminance signal Y—the minimum value P10 of the luminance signal Y), (ii) the value of a variation of the average value P8 of the luminance signal Y, (iii) the value of a variation of the amplitude value P12 of the chrominance signal C, and (iv) the value of a variation of the high-frequency component P11 of the luminance signal Y. If these values are approximately equal and continue over several fields, the microcomputer 4 determines that a fade has occurred. In a similar manner, the microcomputer 4 makes a decision as to a fade to black or gray and the beginning of a scene.

Image-shake correction control to be executed when it is determined that a fade has occurred in an input image will be described below.

If the contrast of the input image decreases in a fade at the end of a scene, the detection precision of the motion-vector detecting circuit 3 decreases. However, since the noise contained in the image also decreases, the probability that the detection of the motion vectors P2 immediately becomes impossible is low. Incidentally, if an image-shake correcting operation is stopped at this time, the input image will abruptly start vibrating while the scene of the input image is displayed.

On the other hand, immediately before the completion of a fade-out, i.e., when the fade coefficient K reaches approximately 0.1, the detection of the motion vectors P2 abruptly becomes completely impossible.

To cope with the above-described disadvantage, in the image-shake correcting system according to the third embodiment, when the fade detecting circuit 20 detects the start of a fade, the image-shake correcting operation is gradually made less effective, and is made to stop immediately before the detection of the motion vectors P2 becomes impossible as the result of the fade.

Incidentally, an appropriate rate at which the image-shake correcting operation is made to vary can be obtained by anticipating a time instant at which the detection of the motion vectors P2 will be impossible, on the basis of the respective values of the variations of the aforesaid detected signals (i), (ii), (iii) and (iv).

To make the image-shake correcting operation less effective, there is a method of multiplying the image correction vector obtained by a normal method, i.e., the reading address P4 of the image memory 2, by a coefficient not greater than "1".

Another method is also effective. For example, in an integration computation for finding the image correction vector from the motion vectors P2, it is possible to perform a computation using a linear or higher-order low-pass filter computation, i.e., $$\text{[image correction vector for current field]} = \text{[motion vector for current field]} + \text{[image correction vector for previous field]} \times Kc$$

where KC is set to a value smaller than "1".

With the above-described image-shake correction control method, it is possible to output a visually natural video image which smoothly varies even if a fade occurs.

As is apparent from the above description, in the third embodiment, the fade detecting means for detecting the occurrence of a fade from an input video signal is provided so that the image-shake correction characteristic of image-shake correcting means can be controlled on the basis of a signal detected by the fade detecting means. Accordingly, even if fade processing is performed, it is possible to output a visually natural, stable video image, so that it is possible to prevent an abrupt stop of the image-shake correcting operation or an abrupt vibration or an image which gives rise to a visually impaired image.

A fourth embodiment of the present invention will be described below.

As described above, a general image-shake correcting system is arranged as shown in FIG. 1.

In the above-described image-shake correcting system shown in FIG. 1, if a shake of actually broadcast television image or an image recorded by a domestic-use video camera is to be corrected, the following problems occur.

As is known, there are some cases where character information indicative of a broadcast time, a broadcast title or note, a Japanese translation or the like is superimposed on the actually broadcast television image. There is also a case where character information indicative of the date or time or content of photography is superimposed on the image recorded by the domestic-use video camera.

If the video signal P1 which contains the thus-superimposed character information is inputted to the motion-vector detecting circuit 3 and is directly used for detecting a motion vector, the motion of the superimposed character is also detected as a motion to be subjected to image-shake correction.

For example, if a character which is displayed at an unchanged position in the image plane, for example, a character indicative of a date or a time, is present in an image, a shake of the image may be detected as a shake smaller than an actual shake in a motion-vector detection area surrounding the display position of such character or a motion-vector detection area which contains the display position of the character.

If a character which moves as if it were flowing in the image plane, such as a moving title or telop indicative of a status of photography, is present in an image, the moving speed of such character may be detected in a motion-vector detecting area surrounding the display position of the character or a motion-vector detecting area which contains the display position of the character.

In either case, if the above-described image-shake correcting system is used to calculate the amount of image shake and correct the image shake on the basis of the calculated amount of the image shake, the image-shake correcting system will perform processing which is not related to the processing of correcting an image shake which occurred during actual photography, thereby producing a visually impaired image.

The fourth embodiment has been made to solve the above-described problems, and its object is to prevent an error from occurring in an image-shake correcting operation owing to a character superimposed on an image, thereby making it possible to provide a visually natural image at all times.

According to the fourth embodiment, there is disclosed an image-shake correcting system which is arranged to detect a plurality of motion vectors from a plurality of detection areas of a reproduced video signal and correct a shake of an image on the basis of the plurality of motion vectors detected from the respective detection areas. The image-shake correcting system includes character detecting means for detecting a signal component of a character superimposed on the video signal, and control means for varying image-shake correction processing for each of the detection areas, according to a detection result indicative of the signal component detected by said detecting means.

According to the fourth embodiment, there is also disclosed an image-shake correcting system which is arranged to detect a motion vector from a reproduced video signal and correct a shake or an image on the basis of the motion vector. The image-shake correcting system includes character detecting means for detecting a signal component of a character superimposed on the video signal, and control means for providing control to stop the processing of correcting the sake of the image, according to a detection result indicative of the signal component detected by said detecting means.

In the above-described image-shake correcting system, the character detecting means may include first detecting means for detecting an edge strength of the image on the basis of the reproduced video signal, second detecting means for detecting a luminance of the reproduced video signal, and coding means for coding the reproduced video signal on the basis of the edge strength of the image detected by the first detecting means and the luminance of the video signal detected by the second detecting means.

The character detecting means may also include first detecting means for detecting an amount of motion of the image on the basis of the reproduced video signal, second detecting means for detecting a luminance of the reproduced video signal, and coding means for coding the reproduced video signal on the basis of the amount of motion of the image detected by the first detecting means and the luminance of the video signal detected by the second detecting means.

The character detecting means also includes first detecting means for detecting an amount of motion of the image of the basis of the reproduced video signal, second detecting means for detecting an edge strength of the image on the basis of the reproduced video signal, and coding means for coding the reproduced video signal on the basis of the amount of motion of the image detected by the first detecting means and the edge strength of the image detected by the second detecting means.

According to the fourth embodiment, the motion vector of an area in which the signal component of a superimposed character has been detected is excluded from motion vectors to be used in calculating the amount of image shake, whereby it is possible to eliminate the influence of the motion of the character which may cause an error in calculating the amount of image shake. It is, therefore, possible to accurately calculate only the amount of image shake which occurred during actual photography.

According to the fourth embodiment, if it is determined from the result of detection of a character superimposed on a video signal that the character may cause an error in calculating the amount of image shake, an image-shake correcting operation is made to stop. Accordingly, it is possible to prevent a visually unnatural image from occurring as a result of image-shake correction.

The fourth embodiment of the present invention will be described below.

Figure 9:
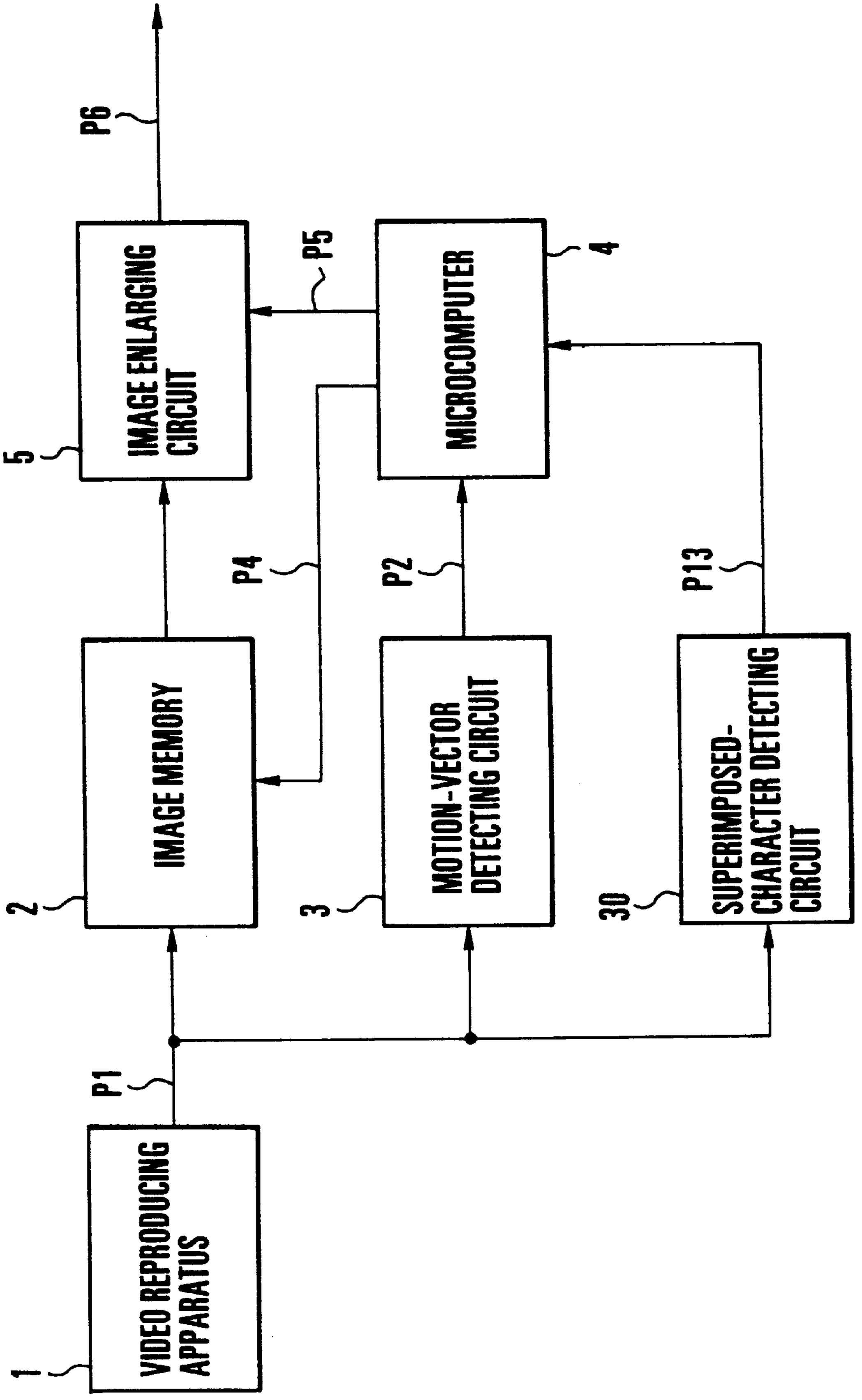
FIG. 9 is a block diagram schematically showing the arrangement of an image-shake correcting system according to a fourth embodiment of the present invention.

FIG. 9 is a block diagram showing the arrangement of an image-shake correcting system according to the fourth embodiment of the present invention. In FIG. 9, identical reference numerals are used to denote blocks having functions identical to those of the corresponding blocks shown in each of FIGS. 2 and 6, and the description thereof is omitted.

In the image-shake correcting system according to the fourth embodiment, a superimposed-character detecting circuit 30 is added to the arrangement of the image-shake correcting system, shown in FIG. 2, according to the first embodiment of the present invention. The microcomputer 4 determines the reading address P4 indicative of a position from which an image is to be read, on the basis of a superimposed-character detection signal P13 outputted from the superimposed-character detecting circuit 30.

The principle of the superimposed-character detecting circuit 30 will first be described below.

In general, the frequency spectrum of an image photographed by a video camera is distributed in a considerably low frequency range compared to the frequency band of a video signal. In contrast, an image indicative of the aforesaid superimposed character is generally a white image having a sharp edge and is concentrated in a somewhat small area of the image plane. Therefore, the image indicative of the aforesaid superimposed character shows a sharply projecting frequency spectrum.

Various superimposing circuits are also put into practice so that a superimposed character can be easily identified if a bright subject is present at a position where the superimposed character is displayed. One superimposing circuit has the function of automatically increasing the luminance of a superimposed character if a bright subject is present. Another superimposing circuit has the function of adding, if a bright subject is present, a black edge of shading to a background area which surrounds the superimposed character.

Accordingly, if a video signal recorded by a video camora is subjected to the aforesaid superimposition processing by such a superimposing circuit, the image photographed by the vide camera and an image indicative of a superimposed character conspicuously differ in frequency component.

The superimposed-character detecting circuit 30 is arranged to extract only the component of a superimposed character from the video signal P1 reproduced by the video reproducing apparatus 1, by utilizing the difference in frequency component between both images.

Figure 10:
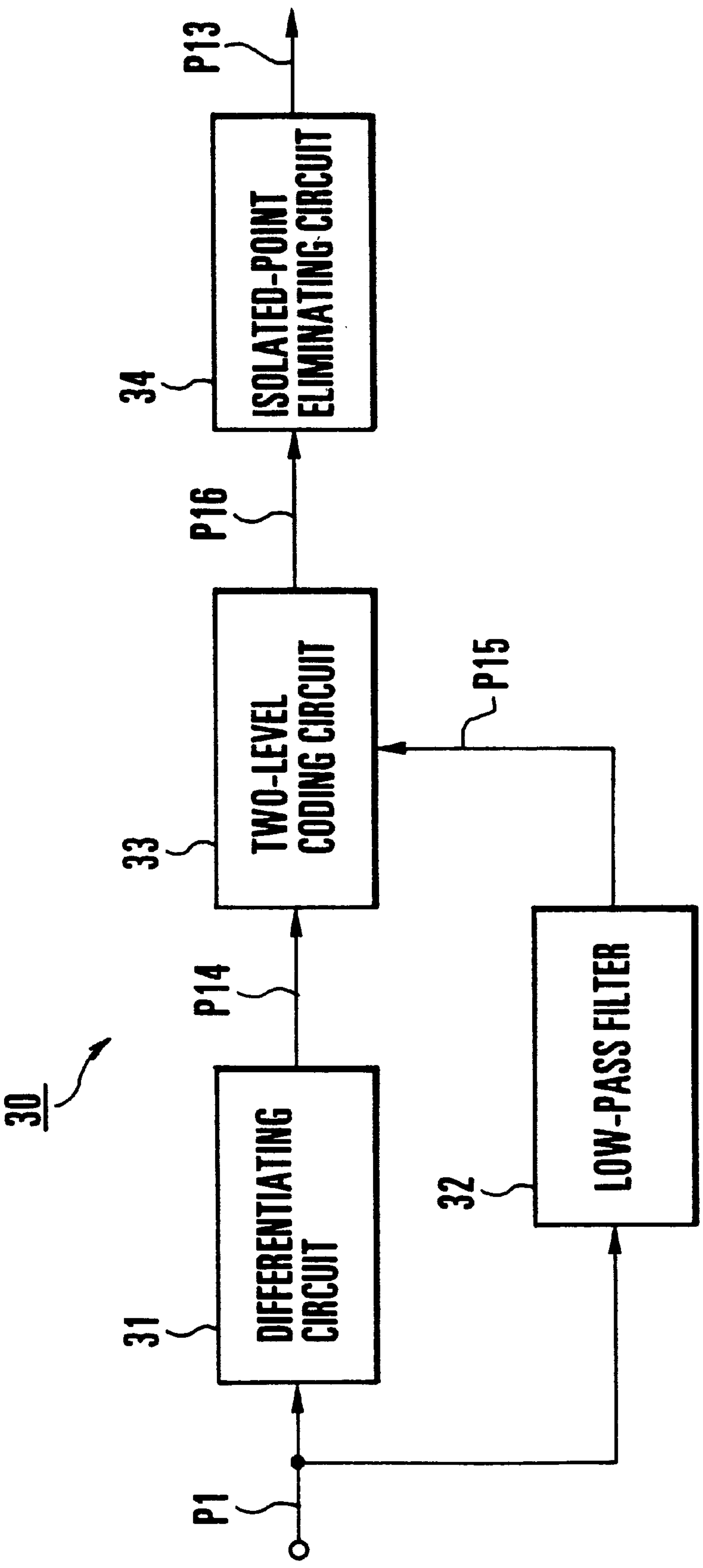
FIG. 10 is a block diagram schematically showing one example of the arrangement of a superimposed-character detecting circuit used in the image-shake correcting system shown in FIG. 9.

One example of the arrangement of the superimposed-character detection circuit 30 is shown in FIG. 10.

The superimposed-character detecting circuit 30 shown in FIG. 10 includes a differentiating circuit 31, a low-pass filter 32, a two-level coding circuit 33 and an isolated-point eliminating circuit 34. In FIG. 10, P1 represents a video signal reproduced by the video reproducing apparatus 1, P14 represents a video signal subjected to edge enhancement in and outputted from the differentiating circuit 31, P15 represents a luminance information signal outputted form the low-pass filter 32, P16 represents a two-level video signal outputted from the two-level coding circuit 33, and P13 represents the aforesaid superimposed-character detection signal.

In the superimposed-character detecting circuit 30 having the above-described arrangement, the input video signal p1 is applied to the differentiating circuit 31 and the low-pass filter 32. On the basis of the video signal P1, the differentiating circuit 31 generates the video signal P14 subjected to edge enhancement. The low-pass filter 32 generates the luminance information signal P15 having average luminance information about an area surrounding a scanned pixel.

The video signal P14 and the luminance information signal P15 are inputted to the two-level coding circuit 33. The two-level coding circuit 33 appropriately varies its threshold level according to the level of the luminance information signal P15 supplied from the low-pass filter 32. Thus, the video signal P14 subjected to edge enhancement, which has been supplied from the differentiating circuit 31, is coded into a two-level signal on the basis of the threshold level.

The two-level video signal P16 produced by the coding circuit 33 is inputted to the isolated-point eliminating circuit 34, in which noise which unexpectedly occurs is eliminated. Then, a portion which contains the video signal P16 in the state of being concentrated in a somewhat small area of the image plane is detected, and the thus-detected signal is outputted as the superimposed-character detecting signal P13 to the microcomputer 4 which follows the superimposed-character detecting circuit 30.

As described above, in the superimposed-character detecting circuit 30 according to the fourth embodiment, it is possible to detect approximately accurately the position in the image plane of a superimposed character which is superimposed on the video signal P1 reproduced by the video reproducing apparatus 1.

Figure 11:
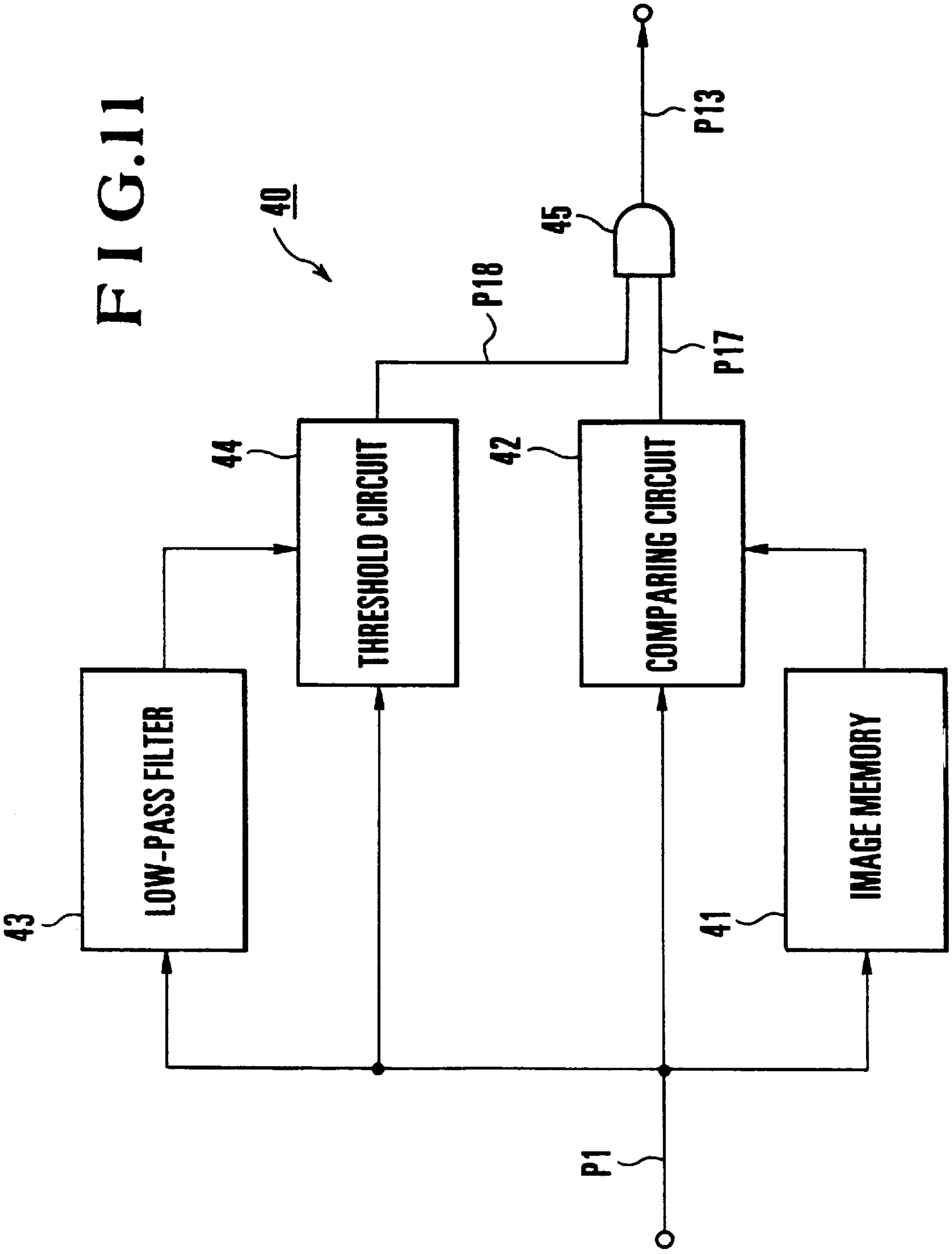
FIG. 11 is a block diagram schematically showing another example of the arrangement of the superimposed-character detecting circuit used in the image-shake correcting system shown in FIG. 9 according to a fifth embodiment of the present invention.

The arrangement of another superimposed-character detecting circuit (indicated by reference numeral 40) is shown in FIG. 11 as a fifth embodiment of the present invention.

The superimposed-character detecting circuit 40 shown in FIG. 11 includes an image memory 41, a comparing circuit 42, a low-pass filter 43, a threshold circuit 44 and an AND circuit 45. In FIG. 11, P17 represents a comparison signal outputted from the comparing circuit 42, and P18 represents a two-level signal outputted from the threshold circuit 44.

In the superimposed-character detecting circuit 40 having the above-described arrangement, the input video signal P1 is applied to the image memory 41 and one input terminal of the comparing circuit 42. The image memory 41 is a FIFO (First-In/First-Out) memory having a memory capacity for one frame, and a video signal of the immediately previous frame is always outputted from the image memory 41.

The video signal thus outputted from the image memory 41 is applied to the other input terminal of the comparing circuit 42. In this manner, two video signals, i.e., the video signal of the current frame and the video signal of the previous frame, are inputted to the comparing circuit 42.

The comparing circuit 42 makes a comparison between the two input signals, i.e., the video signal of the current frame and the video signal of the previous frame, for each pixel. If two pixel signals compared with each other are equal, "1" is applied to one input terminal of the AND circuit 45 as the comparison signal P17. If the two pixel signals are not equal, "0" is applied to the one input terminal of the AND circuit 45 as the comparison signal P17.

In other words, the comparing circuit 42 calculates an interframe difference between the video signal of the current frame and that of the previous frame. Then, the comparing circuit 42 outputs "1" as the comparison signal P17 in the case of a pixel contained in a portion in which such interframe difference is completely absent, i.e., a portion in which an image does not shown a motion at all. In the case of a pixel contained in a portion in which the image shows a motion, the comparing circuit 42 outputs "0" as the comparison signal P17.

In the meantime, the video signal P1 reproduced by the video reproducing apparatus 1 is also applied to one input terminal of each of the low-pass filter 43 and the threshold circuit 44. Incidentally, the low-pass filter 43 and the threshold circuit 44 constitute a so-called adaptive two-level coding circuit.

Specifically, the low-pass filter 43 calculates average luminance information about an area surrounding a scanned pixel from the input video signal P1. The average luminance information calculated by the low-pass filter 43 is applied to the other input terminal or the threshold circuit 44, and the threshold circuit 44 appropriately varies its threshold according to the average luminance information. Thus, the video signal P1 applied to the one input terminal of the threshold circuit 44 is coded into a two-level signal on the basis of the threshold.

In this manner, in the case of a pixel contained in a high-luminance portion of the image, "i" is applied to the other input terminal of the AND circuit 45 as the two-level signal P18, while in the case of a pixel contained in the other portion of the image, "0" is applied to the other input terminal of the AND circuit 45 as the two-level signal P18. The AND circuit 45 calculates the logical product (AND) of the comparison signal P17 and the two-level signal P18, and the result of this calculation is outputted as the superimposed-character detection signal P13 to the microcomputer 4 which follows the AND circuit 45.

The superimposed-character detection signal P13 indicative of "1" represents the position of a pixel contained in a portion in which the image does not show a motion and which has a high luminance. Accordingly, in the superimposed-character detecting circuit 40 according to the fifth embodiment, it is possible to detect approximately accurately a superimposed character, representative of a date, a time or the like, which is displayed at an unchanged position in the image plane.

Incidentally, if the amount of motion of an image is to be detected, it is general practice to find an interframe difference between video signals and divide the resultant value by a parameter indicative of the complexity of the image (for example, an image gradient). However, in the case of the superimposed-character detecting circuit 40 according to the fifth embodiment, it is not particularly important to detect a strict motion of the image.

For this reason, in the fifth embodiment, a calculation is performed on only the aforesaid interframe difference, and neither a computation on the image gradient not a diversion using the image gradient is performed. Accordingly, since a gradient computing circuit or a division circuit can be omitted, it is possible to reduce the entire circuit scale. As a matter of course, in the case of the fifth embodiment as well, the amount of motion of an image may be detected by using the aforesaid general method.

If the reproduced video signal P1 is 8-bit digital data, the comparing circuit 42 need not necessarily perform a comparison computation by using all the 8-bit digital data. In many cases, for example, data for higher-order 3 or 4 bits often suffice to perform the comparison computation.

The above description has referred to the example in which the motion of each image is detected on a frame-by-frame basis. However, the motion of each image may of course be detected on a filed-by-field basis. In this case, the memory capacity of the image memory 41 may be half that required to detect the motion of the image of a frame-by-frame basis.

Figure 12:
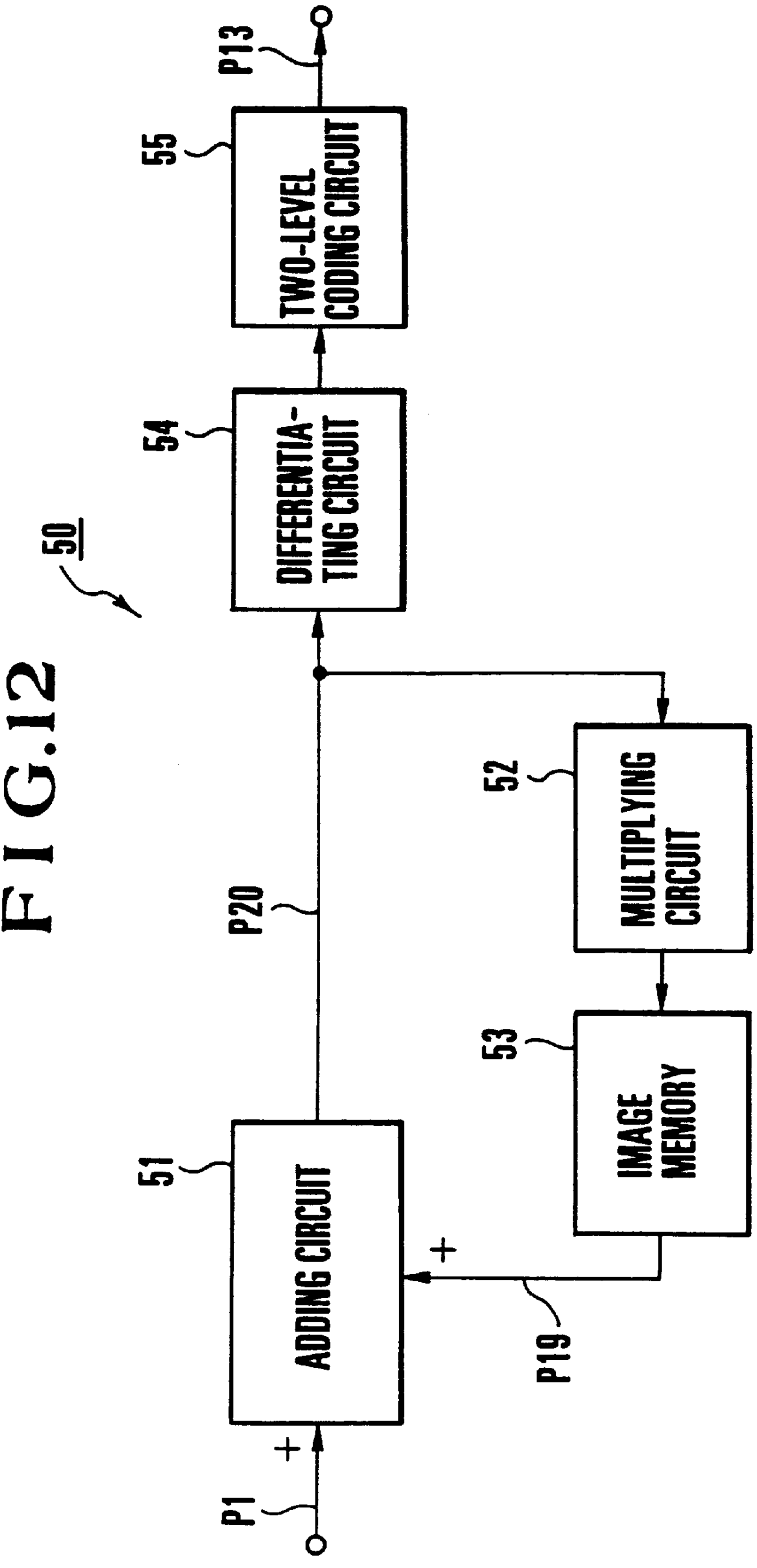
FIG. 12 is a block diagram schematically showing a further example of the arrangement of the superimposed-character detecting circuit used in the image-shake correcting system shown in FIG. 9 according to a sixth embodiment of the present invention.

The arrangement of a further superimposed-character detecting circuit (indicated by reference numeral 50) is shown in FIG. 12 as a sixth embodiment of the present invention.

The superimposed-character detecting circuit 50 includes an adding circuit 51, a multiplying circuit 52, an image memory 53, a differentiating circuit 54, and a two-level coding circuit 55. In FIG. 12, P19 represents a video signal obtained by multiplying a video signal of the previous frame by a predetermined coefficient, and P20 represents a video signal outputted from the adding circuit 51.

A circuit portion made up to the adding circuit 51, the multiplying circuit 52 and the image memory 53 is a circuit portion for detecting the amount of motion of an image. A circuit portion made up of the differentiating circuit 54 and the two-level coding circuit 55 is a circuit portion of detecting edge information about the image.

In the superimposed-character detecting circuit 50 having the above-described arrangement, the input video signal video signal P1 is applied to one input terminal of the adding circuit 51. The video signal P20 outputted from the adding circuit 51 is subjected to predetermined processing by the multiplying circuit 52 and the image memory 53 and the output signal of the image memory 53 is applied to the other input terminal of the adding circuit 51.

The multiplying circuit 52 has a coefficient of not less than 0 and not greater than 1, and multiplies the video signal P20 outputted from the adding circuit 51 by the coefficient. The video signal multiplied by the coefficient by the multiplying circuit 52 is supplied to and temporarily stored in the image memory 53. Similarly to the image memory 41 shown in FIG. 11, the image memory 53 is a FIFO memory having a memory capacity for one frame, and a video signal of the immediately previous frame is always outputted from the image memory 41.

The adding circuit 51 adds together the reproduced video signal P1 of the current frame applied to the one input terminal and the video signal of the previous frame multiplied by the coefficient and applied to the other input terminal. The video signal P20 obtained from this addition is applied to the differentiating circuit 54.

As described above, the adding circuit 51, the multiplying circuit 52 and the image memory 53 form a temporal low-pass filter for the video signal. This temporal low-pass filter has a characteristic which allows it to output a greater value for a pixel signal contained in the portion of the input video signal P1 which has a higher luminance and contains an image showing a smaller motion. The temporal low-pass filter also has the characteristic of, for an image having even a slight motion, deceasing its output level and making the edge of an image extremely unsharp.

Accordingly, if the video signal P20 outputted from the temporal low-pass filter contains a portion having a sharp edge characteristic, it is possible to infer that the portion is a pixel indicative of an image having a sharp edge, no motion and a high luminance. The circuit portion made up of the differentiating circuit 54 and the two-level coding circuit 55 is, therefore, arranged to detect a signal component having the aforesaid sharp edge characteristic and code the video signal P20 according to the result of this detection.

The video signal P20 outputted from the adding circuit 51 is applied to the differentiating circuit 54, and the edge gradient of the video signal P20 is extracted by the differentiating circuit 54. Then, the video signal P20 is coded into a two-level signal according to the signal strength level of the edge gradient by the two-level coding circuit 55. The thus-obtained two-level signal is outputted as the superimposed-character detection signal P13 to the microcomputer 4 which follows the two-level coding circuit 55.

As described above, with the superimposed-character detecting circuit 50 according to the sixth embodiment, it is possible to extract a component indicative of a motionless image, a high luminance and a sharp edge from the input video signal P1. Accordingly, it is possible to detect approximately accurately a superimposed character, representative of a date, a time or the like, which is displayed at an unchanged position in the image plane.

In the sixth embodiment as well, the motion of an image need not necessarily be detected by using all the bits of the video signal P1. Further, the motion of the image need not necessarily be detected on a frame-by-frame basis, and may be detected on a field-by-field basis. If this arrangement is adopted, it is possible to remarkably reduce the entire circuit scale.

As is apparent from the above description, with the superimposed-character detecting circuit 30, 40 or 50 shown in FIGS. 10, 11 or 12, it is possible to extract approximately accurately only the signal component of a superimposed character from a video signal by means of a simple circuit construction.

The operation of the image-shake correcting system according to the fourth embodiment shown in FIG. 9 will be described below with reference to the flowchart shown in FIG. 13.

In the following description, it is assumed that the digital data P5 indicative of an image enlargement ratio, which is given to the image enlarging circuit 5, is constant.

Figure 13:
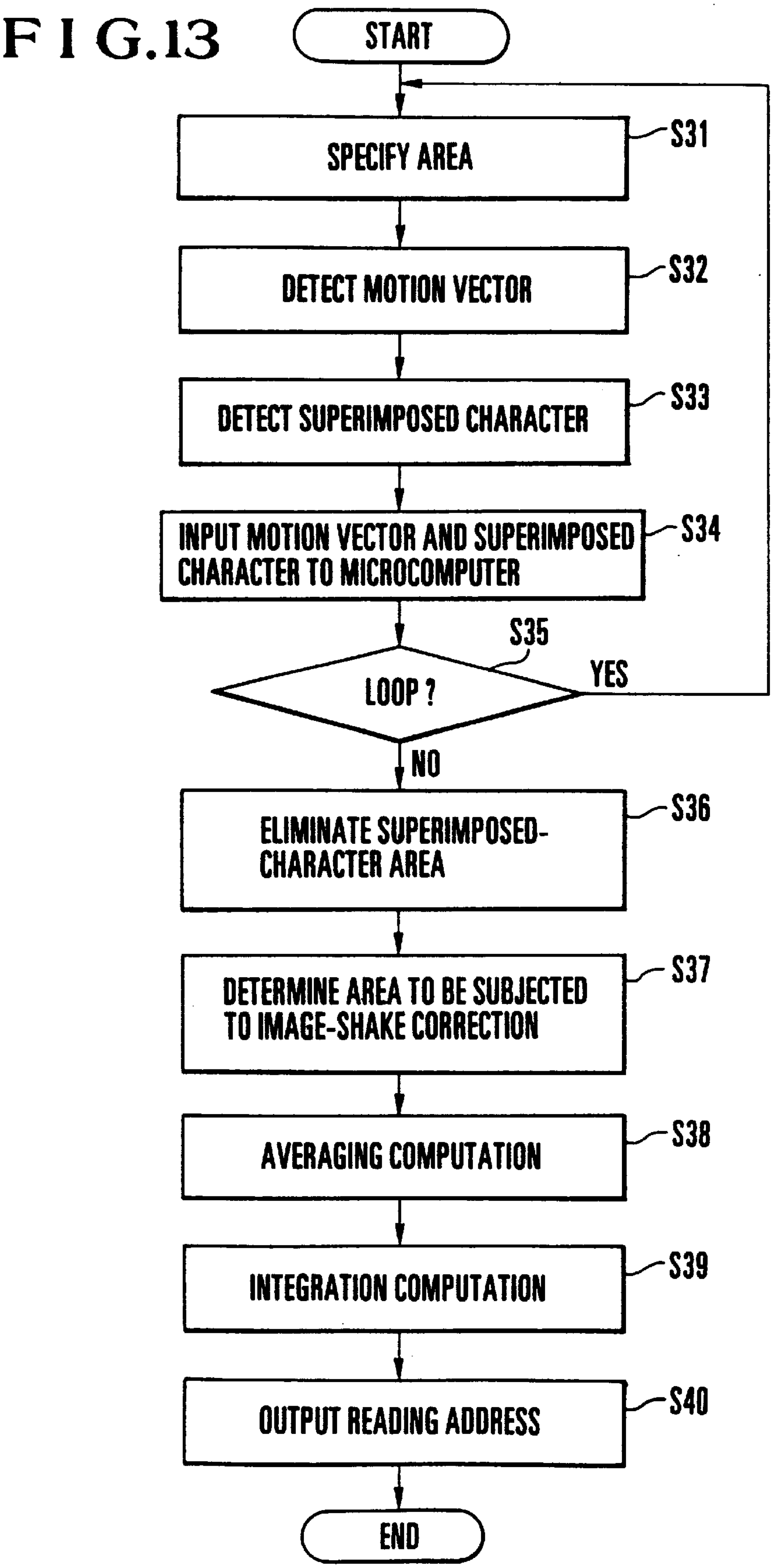
FIG. 13 is a flowchart showing the operation of an image-shake correcting system according to the fourth embodiment of the present invention.

First, in Step S31 of FIG. 13, the motion-vector detecting circuit 3 specifies a motion vector area of an image from which to detect a motion vector. In Step S32, the motion vector P2 is detected from the specified, motion vector area.

In Step S33, regarding the motion vector area specified in Step S31, it is detected whether a character is superimposed on the video signal P1 reproduced by the video reproducing apparatus 1. The detection of the superimposed character is carried out by the above-described superimposed-character detecting circuit 30, 40 or 50 shown in FIGS. 10, 11 or 12.

In Step S34, both the superimposed-character detection signal P13 detected by the superimposed-character detecting circuit 30 and the motion vector P2 detected by the motion-vector detecting circuit 3 in Step S32 are inputted to the microcomputer 4.

If the image contains a plurality of areas from which to detect motion vectors, the process returns from Step S35 to Step S31, and Steps S31 to S35 are repeated. Thus, the motion vectors P2 and the superimposed-character detection signals P13 are inputted from the required areas to the microcomputer 4.

When the motion vectors P2 and the superimposed-character detection signals P13 are inputted from the required areas to the microcomputer 4 in the above-described manner, the processing of image-shake correction is performed in Steps S36 and S37 by the microcomputer 4.

In Step S36, the microcomputer 4 outputs an instruction to inhibit the processing subsequent to Step S36 from employing the motion vectors contained in the areas in which the superimposed characters have been detected. This instruction is executed, as by setting an invalid flag for the motion vector of each of the areas.

In Step S37, it is determined which area is to be subjected to image-shake correction, on the basis of the values of variations of the respective motion vectors inputted to the microcomputer 4 and the state of orientation of the motion vectors in the image. This decision uses only the motion vectors of areas in which the invalid flags are off, i.e., areas in which no superimposed characters are detected.

In Step S38, the average value of the motion vectors of the areas in which the invalid flags are off, i.e., the amount of image shake in the entire image plane, is obtained. In Step S39, an integration computation is performed on the average value of the motion vectors obtained in Step S38, whereby the final amount of image-shake correction is calculated.

In Step S40, the address signal P4 indicative of a position from which ot read a video signal stored in the image memory 2 is determined on the basis of the amount or image-shake correction calculated in Step S39. The address signal P4 is outputted to the image memory 2. The video signal stored at the position specified by the address signal P4 is outputted from the image memory 2 to the image enlarging circuit 5. Subsequently, the above-described steps S31 to S40 are repeated for each field.

The above-described processing of Step S36 is equivalent to the processing of eliminating the motion vectors of areas which contain superimposed characters from the motion vectors detected by the motion-vector detecting circuit 3. Accordingly, in the processing subsequent to Step S36, only motion vectors other than the eliminated motion vectors are employed, so that the address signal P4 determined in Step S40 becomes a value which is not influenced by the amount of motion of the superimposed characters representative of a data, a time or the like.

As is apparent from the above description, the image-shake correcting system according to the fourth embodiment is characterized by including the superimposed-character detecting circuit 30 for detecting the position of a superimposed character in the image plane, and is arranged to calculate the amount of image shake after excluding the motion vectors of an area which contains the superimposed character detected by the superimposed-character detecting circuit 30.

Since the image-shake correcting system is arranged in the above-described manner, even if characters representative of a date, a time or the like are superimposed on a video signal, it is possible to accurately detect only the amount of shake of an image recorded during photography, whereby it is possible to carry out image-shake correction free of malfunction.

An image-shake correcting system according to a seventh embodiment of the present invention will be described below.

The image-shake correcting system according to the seventh embodiment has been made in light of the following problem.

It is known that characters are superimposed on an actually broadcast television image or an image photographed by a domestic-use video camera, most frequently, in the form of characters representative of a data or a time. The characters are normally superimposed in a peripheral portion, such as the bottom right or left, of the image plane.

The superimposed-character detecting circuit 30 described previously in connection with the fourth embodiment necessarily provides a detection result containing a particular extent of detection error. As a result, the stability of the operation of the image-shake correcting operation depends on the kind of photographed image. For this reason, according to the seventh embodiment, the following computation is performed in the processing of Step S38 in the flowchart shown in FIG. 13 to prevent the above-described problem.

FIG. 14 shows an example of a television image plane which is used to explain the principle of the seventh embodiment.

The television image plane shown in FIG. 14 contains six rows and ten columns, a total of sixty motion-vector detection areas. In the following description, the position of each of the motion-vector detection areas is indicated by (i, j), where i represents a row number (i=1–6) and j represents a column number (j=1–10).

In FIG. 14, reference numeral 121 denotes the effective pixel area or the television image plane, reference numeral 122 denotes an outermost, first detection area from among the sixty motion-vector detection areas of the image plane, reference numeral 123 denotes a second detection area immediately inside of the first detection area 122, reference numeral 124 denotes an innermost, third detection area. Reference numeral 125 denotes a date character superimposed on the image, reference numeral 126 denotes a time character superimposed on the image, and reference numeral 127 denotes an erroneous detection area which is originally not a superimposed-character area but is erroneously detected as an superimposed-character area.

Different weight coefficients are respectively assigned to the first detection area 122, the second detection area 123 and the third detection area 124 according to the probability that a superimposed character is contained in each of the areas. The weight coefficients are selected to become larger toward the outside of the image plane in the order of, for example, 0.1, 0.9 and 1.0.

In the seventh embodiment, in Step S38 of the flowchart shown in FIG. 13, an averaging computation is performed on the motion vectors of the respective detection areas by means of the following expression (1) by using the weight coefficients set in the above-described manner:

$$MV_a = \frac{\sum MV(i,j)\times(1-T(i,j)\times W(i,j))}{\sum(1-T(i,j)\times W(i,j))} \tag{1}$$

Summation range: $i = 1$ to 6, $j = 1$ to 10 where MVa represents the result of the averaging computation; MV represents the motion vector value of each of the detection areas; T represents an invalid flag (0 or 1) which represents whether a superimposed character has been detected in each of the detection areas; and W represents each of the weight coefficients which are respectively assigned to the first detection area 122 to the third detection area 124.

According to the averaging computation shown as Expression (1), the invalid flag T (=1) is multiplied by the weight coefficient W of 1.0 for a detection area (5, 10) on which the date character 125 is superimposed, so that the motion vector of the detection area (5, 10) is excluded form the averaging computation. Similarly, the invalid flag T (=1) is multiplied by the weight coefficient W of 1.0 for a detection area (6, 10) on which the time character 126 is superimposed, so that the motion vector of the detection area (6, 10) is excluded from the averaging computation.

Regarding a detection area (4, 5) which contains the erroneous detection area 127, the invalid flag T (=1) is multiplied by the weight coefficient W of 0.1, so that the motion vector is estimated with a weight of 0.9. In other words, in spite of the face that an erroneous superimposed character has been detected from the detection area (4, 5), the motion vector is used for the averaging computation in a normal manner.

As is apparent from the above description, according to the seventh embodiment, it is possible to determine whether each motion vector detected by the superimposed-character detecting circuit 30 is an erroneously detected motion vector, on the basis of the weight coefficient assigned to each of the detection areas. Accordingly, even if the detection result provided by the superimposed-character detecting circuit 30 contains a particular extent of detection error, it is possible to prevent the image-shake correcting operation from becoming unstable.

The method used in the above-described seventh embodiment can be applied in various manners. For example, the two-level coding circuit 33 shown in FIG. 10 may be arranged so that the threshold level becomes lower for the outermost, first detecting area 122 of the image plane. The isolated-point eliminating circuit 34 may be arranged so that its ability to eliminate an isolated point become lower for the first detecting area 122. Either of these arrangements is effective in that the superimposed-character detecting circuit 30 becomes able to easily detect a small or low-luminance superimposed character.

An image-shake correcting system according to an eighth embodiment of the present invention will be described below.

As described above, the superimposed-character detecting circuit 30 in rare cases erroneously detects a normal subject as a superimposed character and generates the superimposed-character detection signal P13. If this erroneously detected, superimposed-character detection signal P13 is used in the processing of correcting an image shake, the operation of correcting an image shake (image-shake correcting operation) becomes unstable.

The image-shake correcting system according to the eighth embodiment is arranged to be able to prevent the above-described problem. Specifically, the image-shake correcting system according to the eighth embodiment is arranged as shown in FIG. 15.

Figure 15:
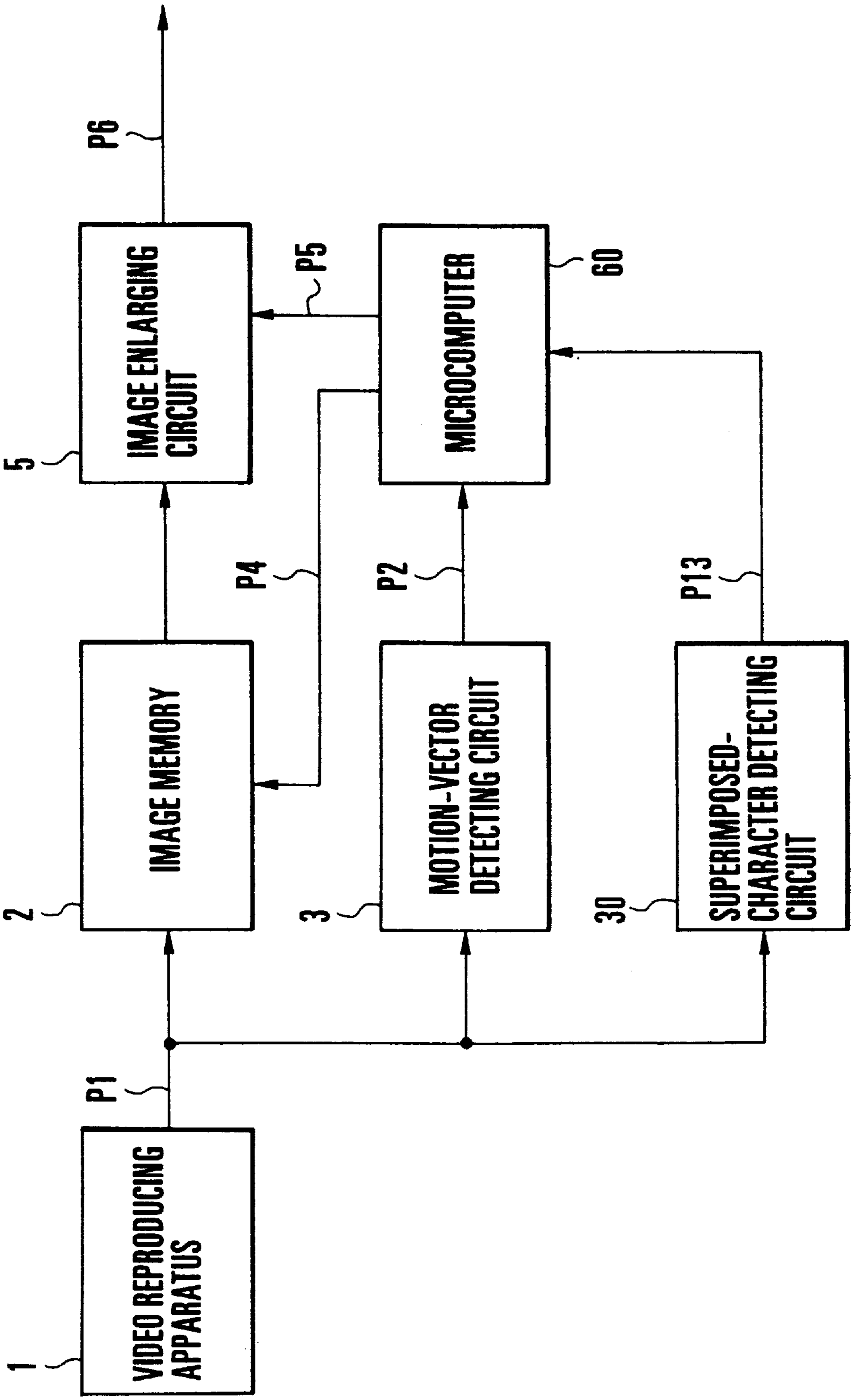
FIG. 15 is a block diagram schematically showing the arrangement of an image-shake correcting system according to an eighth embodiment of the present invention.

Referring to FIG. 15, a microcomputer 60 determines whether the superimposed-character detection signal P13 detected by the superimposed-character detecting circuit 30 is a correctly detected signal, and determines whether the image-shake correcting operation is to be continued, on the basis of the result of this decision.

The operation of the image-shake correcting system according to the eighth embodiment will be described below with reference to the flowchart shown in FIG. 16.

Figure 16:
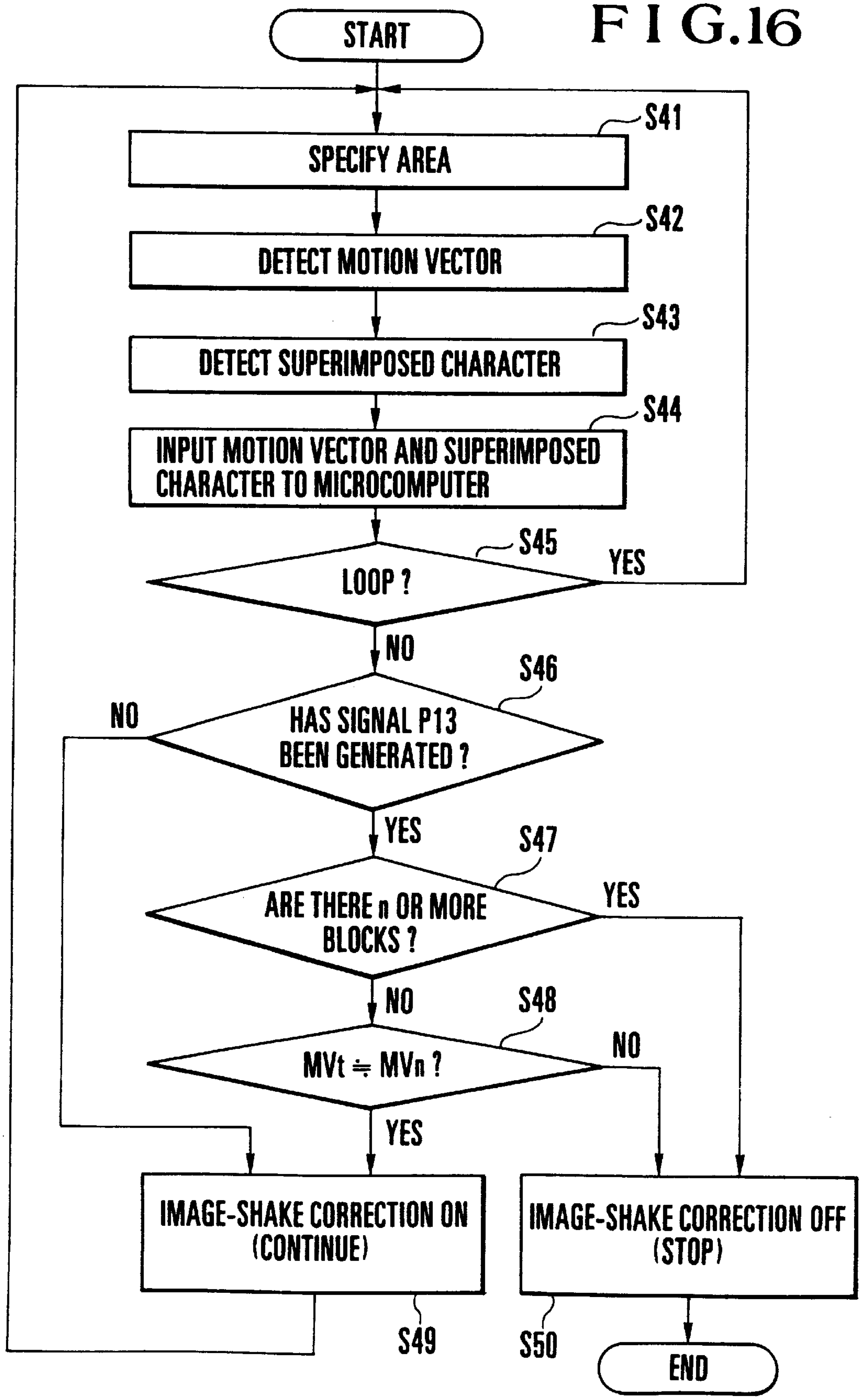
FIG. 16 is a flowchart showing the operation of the image-shake correcting system according to the eighth embodiment of the present invention.

The processing of Steps S41 to S45 shown in FIG. 16 is identical to the processing of Steps S31 to S35 of the flowchart shown in FIG. 13. When the processing of Steps S41 to S45 is completed, the microcomputer 60 performs the processing of Steps S46 to S50 which will be described below.

In Step S46, the microcomputer 60 determines whether the superimposed-character detection signal P13 has been generated by the motion-vector detecting circuit 3, i.e., whether superimposed characters have been detected by the superimposed-character detecting circuit 30. If it is determined in Step S46 that no superimposed characters have been detected at all, the process proceeds to Step S49, in which the image-shake correcting operation is continued.

On the other hand, if it is determined that superimposed characters have been detected by the superimposed-character detecting circuit 30, the process proceeds to Step S47, in which it is determined whether the number of areas in which the superimposed characters have been detected are equal to or greater than "n". For example, if an image has sixty motion-vector detection areas, a number as great as 10 is used as "n".

If it is determined in Step S47 that the number of the areas in which the superimposed characters have been detected is equal to our greater than "n", the process proceeds to Step S50, in which the image-shake correcting operation is made to stop. This is because such a decision substantially means that the superimposed characters are title characters which are displayed i the image plane on an enlarged scale. If the number of the areas in which the superimposed characters have been detected are less than "n", the process proceeds to Step S48.

In Step S48, a comparison is made between a motion vector value MVt of the areas in which the superimposed characters have been detected and a motion vector value MVn of the other areas. In Step S48, if the following condition is satisfied, $$MVt \approx MVn \qquad (2)$$

this indicates that a background subject and the superimposed characters are moving at the same speed.

In this case, it is possible to infer that a normal subject has erroneously been detected as the superimposed characters by the superimposed-character detecting circuit 30. Otherwise, even if the superimposed characters have been correctly detected by the superimposed-character detecting circuit 30, it is possible to infer that the superimposed characters and the normal subject are moving in the image plane at the same speed.

For this reason, in such a case, even if the image-shake correcting is continued, a visually unnatural image in which only the superimposed characters are moving around in the image plane is not produced. Accordingly, if the aforesaid expression (2) is satisfied, the process proceeds to Step S49, in which the image-shake correcting operation is continued.

If the aforesaid expression (3) is not satisfied, either of the following two states occurs.

If the following condition is satisfied, $$MVt \ll MVn \qquad (3)$$

it is inferred that the image has a shake and the superimposed characters are laid on the image at a fixed position. In this case, there is the problem that if the image-shake correcting operation is continued, it is impossible to effect an accurate image-shake correction.

Contrarily, if the following condition is satisfied, $$MVt \gg MVn \qquad (4)$$

it is inferred that the image has a small shake and the superimposed characters are laid on the image while they are moving as if it were flowing. In this case as well, it is impossible to effect an accurate image-shake correction.

For this reason, in either of the cases where the aforesaid expression (2) is not satisfied, the process proceeds to Step S50. The above-described processing of Step S41 to S50 is repeated for each field.

The image-shake correcting system according to the eighth embodiment is designed on the assumption that the detection result provided by the superimposed-character detecting circuit 30 contains a particular extent of detection error. However, if the precision at which the characters are detected by the superimposed-character detecting circuit 30 is completely reliable, as soon as the superimposed characters are detected, the image-shake correcting operation may be stopped.

In this arrangement, if it is determined in Step S46 of FIG. 16 that the superimposed characters have been detected, the process immediately proceeds to Step S50 without passing through Steps S47 and S48, and the image-shake correcting operation is made to stop.

As is apparent from the above description, for example, even if a character superimposed during recording is laid on a video signal, it is possible to prevent occurrence of a visually unnatural image in which only the portion of the superimposed character moves around in the image plane.

According to the fourth embodiment, the image-shake correcting system is provided with character detecting means for detecting the signal component of a character superimposed on a video signal, and is arranged to correct a shake of an image by using the motion vectors of detection areas other than a detection area in which the signal component of the character is detected by the character detecting means. Accordingly, even if a character representative of a date, a time or the like is superimposed on the video signal, it is possible to eliminate the influence of a motion of the character which may cause an error in calculating the amount of image shake. It is, therefore, possible to accurately calculate only the amount of image shake which occurred during actual photography.

According to the seventh and eighth embodiments, the image-shake correcting system is provided with character detecting means for detecting the signal component of a character superimposed on a video signal, and is arranged to control the image-shake correcting operation on the basis of a detection result provided by the character detecting means. Accordingly, if it is likely that a motion of the character causes an error in calculating the amount of image shake, it is possible to stop the image-shake correction operation. It is, therefore, possible to prevent occurrence of a visually unnatural image in which only a character portion moves around in the image plane.

Accordingly, in the above-described image-shake correcting system, it is possible to effect image-shake correction free of malfunction at all times. In addition, it is possible to prevent a visually unnatural image from occurring as a result of image-shake correction, whereby it is possible to obtain a visually natural image at all times.

What is claimed is:

1. An image-shake correcting system, comprising:

image shifting means for processing an input image signal and shifting an image indicated by the input image signal;

scene-change detecting means for detecting a scene change in the image; and control means for controlling an amount in which the image is shifted by said image shifting means according to an output of said scene-change detecting means, said control means resetting motion information, obtained accumulating an amount of past motion of the image, in response to a detection of the scene change by said scene-change detecting means.

2. An image-shake correcting system according to claim 1, wherein said control means resets a cumulative value obtained by accumulating an amount of past motion of the image.

3. An image-shake correcting system according to claim 1, wherein when said scene-change detecting means detects the scene change, said control means returns an image cut-out position to a center of the image.

4. An image-shake correcting system according to any one of claims 1 to 3, wherein said scene-change detecting detects the presence or absence of the scene change on the basis of a comparison result obtained by comparing a magnitude of a maximum correlation value between a previous image and a current image with a threshold and a comparison result obtained by comparing a magnitude of a temporal variation of the maximum correlation value with a threshold.

5. An image-shake correcting system according to claim 1, wherein the input video signal is a image signal outputted from a video reproducing apparatus.

6. An image-shake correcting system according to claim 1, wherein said image shifting means includes an image memory for storing the input image signal, motion-vector detecting means for detecting a motion vector from the input image signal, and memory controlling means for controlling an image reading position of said image memory on the basis of an output of said motion-vector detecting means.

7. An image-shake correcting apparatus comprising:

image shifting means for processing an input image signal and shifting an image indicated by the input image signal, scene-change detecting means for detecting a scene change of the image in the input image signal; and control means for controlling said image shifting means according to an output of said scene-change detecting means so as to stop an image shifting operation of said image shifting means and to reset a shifting position of said image shifting means, said control means resetting motion information, obtained a accumulating an amount of past motion of the image, in response to a detection of the scene change by said scene-change detecting means.

8. Apparatus according to claim 7, wherein said control means resets a cumulative value obtained by accumulating an amount of past motion of the image.

9. Apparatus according to claim 7, wherein when said scene-changing detecting means detects the scene change, said control means resets an image cut-out position to a center of the image.

10. Apparatus according to anyone of claims 7 to 9, wherein said scene-change detecting means detects the presence or absence of the scene change on the basis of a comparison result obtained by comparing a magnitude of a maximum correlation value between a previous image and a current image with a threshold and a comparison result obtained by comparing a magnitude of a temporal variation of the maximum correlation value with a threshold.

11. Apparatus according to claim 7, wherein the input image signal comprises a video signal outputted from a video reproducing apparatus.

12. Apparatus according to claim 7, wherein said image shifting means includes an image memory for storing the input image signal, motion-vector detecting means for detecting a motion vector from the input image signal, and memory controlling means for controlling an image reading position of said image memory on the basis of an output of said motion-vector detecting means.

13. An image-shaped correcting method comprising the steps of:

and image shifting step for processing an input image signal and shifting an image indicated by the input image signal;

a scene-change detecting step for detecting a scene change of the image in the input image signal;

a control step for controlling said image shifting step according to an output of said scene-change detecting step so as to stop an image shifting operation of said image shifting step and to reset a shifting position of said image shifting step, said control step resetting motion information, obtained by accumulating an amount of past motion of the image, in response to a detection of the scene change by said scene-change detecting step.

14. A method according to claim 13, wherein said control step resets a cumulative value obtained by accumulating an amount of past motion of the image.

15. A method according to claim 13, wherein when said scene-changing detecting step detects the scene change, said control step resets an image cut-out position to a center of the image.

16. A method according to any one of claims 13 to 15, wherein said scene-changing step detects the presence or absence of the scene change on the basis of a comparison result obtained by comparing a magnitude of a maximum correlation value between the previous image and a current image with a threshold and a comparison result obtained by comparing a magnitude of a temporal variation of the maximum correlation value with a threshold.

17. A method according to claim 13, wherein the input image signal comprises a video signal outputted from a video reproducing apparatus.

18. A method according to claim 13, wherein said image shifting step includes the steps of:

storing the input image signal in an image memory;

a motion-vector detecting step for detecting a motion-vector from the input signal; and a memory-controlling step for controlling an image reading position of said image memory on the basis of an output of the motion-vector detecting step.

* * * * *

UNITED STATES PATENT AND TRADEMARK OFFICE

CERTIFICATE OF CORRECTION

PATENT NO. : 6,049,354
DATED : April 11, 2000
INVENTOR(S) : Masayoshi Sekine, et al.

It is certified that error appears in the above-identified patent and that said Letters Patent is hereby corrected as shown below:

COVER PAGE AT ITEM [54] TITLE:
Change "IMAGE SHAKE-CORRECTING" to --IMAGE- SHAKE CORRECTING --.

COVER PAGE AT ITEM [75] ASSIGNEE:
"Canon Kabushiki Kaisha, Japan" should read --Canon Kabushiki Kaisha, Tokyo, Japan--.

COLUMN 6:
Line 28, "or" should read --of--; and
Line 52, "Instituted" should read --Institute --.

COLUMN 10:
Line 12, "reproducing" should read --reproduced --; and
Line 50, "rest" should read --reset--.

COLUMN 11:
Line 42, "now" should read --how--.

COLUMN 14:
Line 61, "sake" should read --shake--.

COLUMN 15:
Line 16, "of" should read --on--.

COLUMN 16:
Line 14, "vide" should read --video--; and
Line 30, "form" should read --from--.

UNITED STATES PATENT AND TRADEMARK OFFICE

CERTIFICATE OF CORRECTION

PATENT NO. : 6,049,354
DATED : April 11, 2000
INVENTOR(S) : Masayoshi Sekine, et al.

It is certified that error appears in the above-identified patent and that said Letters Patent is hereby corrected as shown below:

COLUMN 17:
Line 58, "i" should read --1--.

COLUMN 18:
Line 37, "of " should read --on--; and
Line 57, "video signal" should be deleted.

COLUMN 19:
Line 20, "deceasing" should read --decreasing--.

COLUMN 20:
Line 47, "ot" should read --to--.

COLUMN 22:
Line 50, "become" should read --becomes--.

UNITED STATES PATENT AND TRADEMARK OFFICE

CERTIFICATE OF CORRECTION

PATENT NO. : 6,049,354
DATED : April 11, 2000
INVENTOR(S) : Masayoshi Sekine, et al.

It is certified that error appears in the above-identified patent and that said Letters Patent is hereby corrected as shown below:

COLUMN 23:
Line 37, "our" should read --or--: and
Line 41, "i" should read --in --.

Signed and Sealed this

Fifth Day of June, 2001

Attest:

Nicholas P. Godici

NICHOLAS P. GODICI

*Attesting Officer*

*Acting Director of the United States Patent and Trademark Office*